(12) United States Patent
Wickliffe

(10) Patent No.: US 12,392,403 B2
(45) Date of Patent: Aug. 19, 2025

(54) BICYCLE CHAINRING WITH OFFSET AND FULL WIDE TEETH

(71) Applicant: WICK WERKS LLC, Ogden, UT (US)

(72) Inventor: Christoper A. Wickliffe, Ogden, UT (US)

(73) Assignee: WICK WERKS LLC, Ogden, UT (US)

( * ) Notice: Subject to any disclaimer, the term of this patent is extended or adjusted under 35 U.S.C. 154(b) by 0 days.

(21) Appl. No.: 17/943,507

(22) Filed: Sep. 13, 2022

(65) Prior Publication Data

US 2023/0366457 A1 Nov. 16, 2023

Related U.S. Application Data

(60) Provisional application No. 63/342,583, filed on May 16, 2022.

(51) Int. Cl.
*F16H 55/30* (2006.01)
*B62M 9/00* (2006.01)

(52) U.S. Cl.
CPC ............. *F16H 55/30* (2013.01); *B62M 9/00* (2013.01); *B62M 2009/005* (2013.01)

(58) Field of Classification Search
CPC ............. F16H 55/30; F16H 7/18; B62M 9/30
USPC .................................................. 474/152, 140
See application file for complete search history.

(56) References Cited

U.S. PATENT DOCUMENTS

| | | | |
|---|---|---|---|
| 9,062,758 B2 | 6/2015 | Reiter | |
| 9,291,250 B2 | 3/2016 | Reiter et al. | |
| 9,463,844 B2 * | 10/2016 | Fukunaga | B62M 9/10 |
| 9,731,791 B2 | 8/2017 | Reiter et al. | |
| 10,352,397 B2 * | 7/2019 | Kamada | B62M 9/10 |
| 10,358,186 B2 * | 7/2019 | Sugimoto | B62M 9/105 |
| 10,378,638 B2 * | 8/2019 | Chin | F16H 55/30 |
| 10,451,166 B2 * | 10/2019 | Winans | F16G 13/06 |
| 10,563,746 B2 * | 2/2020 | Barefoot | B62M 9/00 |
| 10,808,824 B2 * | 10/2020 | Sugimoto | B62M 9/10 |
| 2015/0239528 A1 * | 8/2015 | Barefoot | F16H 55/30 474/152 |
| 2016/0053882 A1 * | 2/2016 | Watarai | F16H 55/30 474/152 |
| 2016/0208903 A1 * | 7/2016 | Goates | B62M 9/105 |
| 2016/0347409 A1 * | 12/2016 | Watarai | B62M 9/02 |
| 2017/0234418 A1 * | 8/2017 | Barefoot | F16H 55/30 474/156 |
| 2018/0112764 A1 * | 4/2018 | Sugimoto | B62M 9/00 |

(Continued)

*Primary Examiner* — Anna M Momper
*Assistant Examiner* — Juan J Campos, Jr.
(74) *Attorney, Agent, or Firm* — Taft Stettinius & Hollister LLP; Derek B. Lavender; Ryan O. White

(57) ABSTRACT

A bicycle chain ring having a plurality of teeth extending radially about an axis of the chain ring, the plurality of teeth including a first group of teeth and a second group of teeth. The first group of teeth has a first width at a tooth base that is sized to be received within a chain cavity defined between parallel links of a bicycle chain. The second group of teeth has a second width at the tooth base, the second width being different from the first width. Further, the first group of teeth have a tooth tip that is substantially centered on a plane defined between an inner surface and an outer surface of the chain ring and the second group of teeth is at least partially offset from the plane.

10 Claims, 37 Drawing Sheets

(56) References Cited

U.S. PATENT DOCUMENTS

2018/0347680 A1\* 12/2018 Akanishi ................. F16H 55/30
2020/0149621 A1\* 5/2020 Barefoot ................. F16H 55/30

\* cited by examiner

BICYCLE CHAINRING WITH OFFSET AND FULL WIDE TEETH

CROSS REFERENCE TO RELATED DISCLOSURE

The present disclosure claims the benefit of U.S. Provisional Application No. 63/342,583 filed May 16, 2022, the contents of which are incorporated herein by reference in entirety.

FIELD OF THE DISCLOSURE

The present disclosure relates to a bicycle chain ring and more specifically to a bicycle chain ring with teeth having offset widths.

BACKGROUND

This invention relates to bicycle components, and in particular to chainrings used in bicycles. Bicycles commonly use a roller chain to transfer force from a pedal through a crank to a sprocket (a chainring) or set of sprockets (chainrings) in a crankset, and then via the chain to another sprocket or set of sprockets connected to the axle of the wheel to be turned by the force. Sprockets at either the front or rear transfer torque from the cyclist by engaging sprocket teeth between the rollers of the bicycle drive chain—a chain made up of segments or links—with the links typically made with plates that are joined via pins passing through the link plates and rollers. The links are assembled with one set of joining plates inside (nearer the rollers) and one of joining plates set outside, thus creating the inner and outer chain links. Thus there is a side-to-side spacing difference for the inner and outer links.

The teeth of the sprocket extend into the spaces or gaps bounded between rollers longitudinally, and between the side plates axially. To match as exactly as practical these spaces, one prior solution is to make every other tooth of the sprocket wider, so as to fit closely between the outer links of the chain. Then, each narrow tooth (every other tooth in the arrangement) is made to fit loosely between the inner links of the chain. This configuration is frequently called "Narrow-Wide" in the bicycling industry, and will be referred to as "Narrow-Wide" hereinafter. This Narrow-Wide configuration offers some advantages in 1) chain retention (when the bicycle is ridden on very rough terrain, as in mountain biking, the chain can be violently jostled but stay in place); and 2) keeping the chain tracking onto the chainring even when front and rear sprockets are not co-planar.

Traditional chainrings with teeth of all the same width in a straight alignment, with no tooth that is "wide" or "narrow" compared to the other teeth, are also used for bicycle applications. These chainrings have been the most common, but have been known to "throw" the chain in really rough terrain—especially when the chain alignment is such that the front sprocket on the crankset and the rear sprocket on the wheel axle are not aligned upon the same plane.

SUMMARY

One embodiment of this disclosure is a bicycle chain ring that has a plurality of teeth extending radially about an axis of the chain ring, the plurality of teeth including a first group of teeth and a second group of teeth. The first group of teeth have a first width at a tooth base that is sized to be received within a chain cavity defined between parallel links of a bicycle chain. The second group of teeth has a second width at the tooth base, the second width being different from the first width. Further, the first group of teeth have a tooth tip that is substantially centered on a plane defined between an inner surface and an outer surface of the chain ring and the second group of teeth are at least partially offset from the plane.

In one example of this embodiment, the second width is less than the first width.

Another example of this embodiment has a third group of teeth having a third width that is different from the first width. In one aspect of this example the third width is less than the first width. In another aspect of this example the second group of teeth is offset to an inward side of the plane and the third group of teeth is offset to an outward side of the plane.

In yet another example of this embodiment, the first width is about the width of the space between two outer chain links of a bicycle chain. In one aspect of the example, the second width is less than the width of the space between two inner chain links of a bicycle chain. One aspect of this example has a series of teeth that is a first tooth from the first group of teeth followed by a second tooth from the second group of teeth followed by a third tooth from the third group of teeth. In one part of this aspect, the series of teeth continues around the entire circumference of the chain ring.

Another aspect of this example is a sequence of teeth around the chain ring that is a first tooth from the first group of teeth followed by a second tooth from the second group of teeth followed by a third tooth from the first group of teeth. In a further aspect of this example, the third tooth is followed by a fourth tooth from the second group of teeth followed by a fifth tooth from the third group of teeth followed by a sixth tooth from the second group of teeth followed by a seventh tooth from the first group of teeth.

BRIEF DESCRIPTION OF THE FIGURES

The drawings illustrate exemplary embodiments for carrying out the invention. Like reference numerals refer to like parts in different views or embodiments of the present invention in the drawings.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1A:
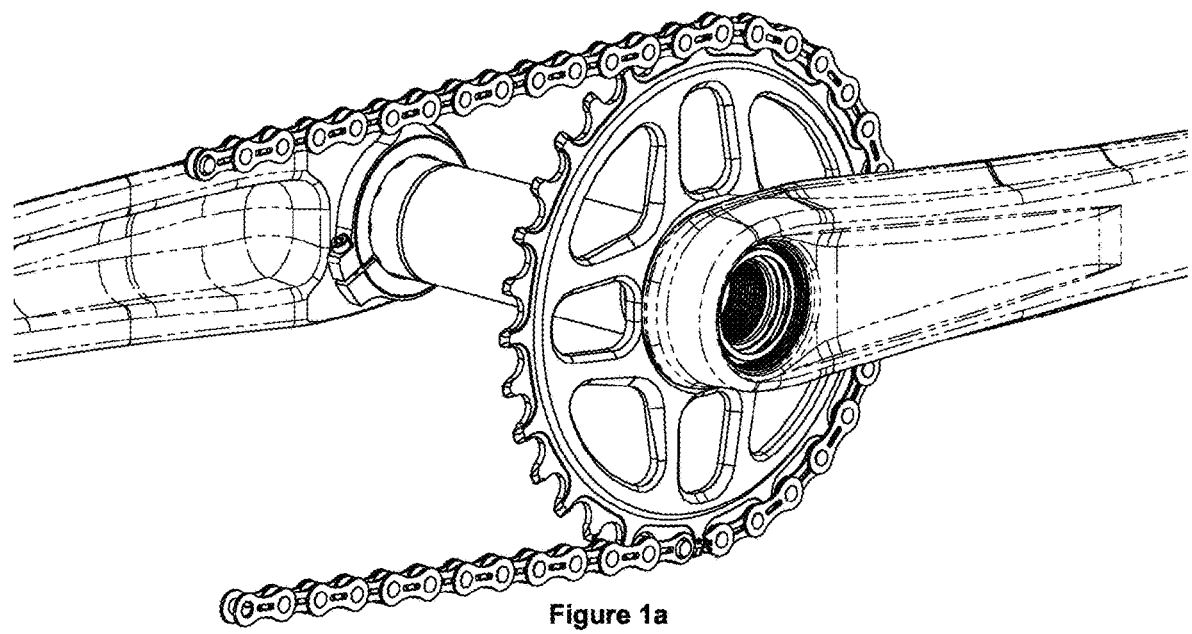
FIG. 1a is a right side perspective view of an embodiment of a chainring of the invention installed in a bicycle crankset, with a segment of roller chain engaged on the chainring.
Figure 1B:
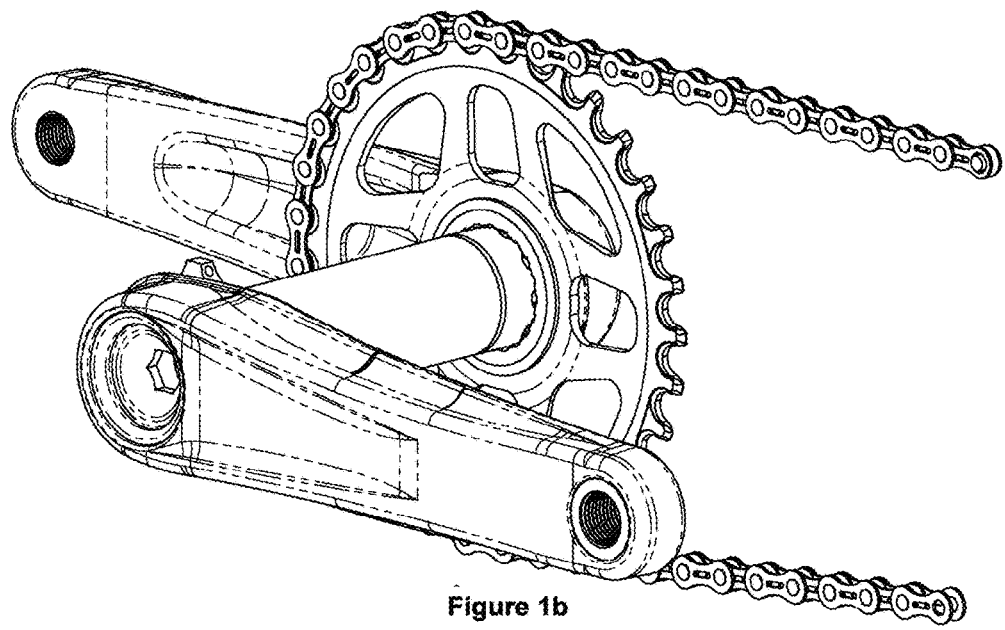
FIG. 1b is a left side perspective view of an embodiment of a chainring of the invention installed in a bicycle crankset, with a segment of roller chain engaged on the chainring.

FIGS. 1A and 1B illustrate a chainring of this disclosure coupled to a crankset in one configuration. FIGS. 1A and 1B do not specifically illustrate the remaining component of a bicycle, but a person skilled in the art understands that the crankset would typically be mounted to a frame and pedals and the chain would be connected to a rear sprocket to drive the rear sprocket and rear wheel as the crankset is rotated via the chain.

Figure 2:
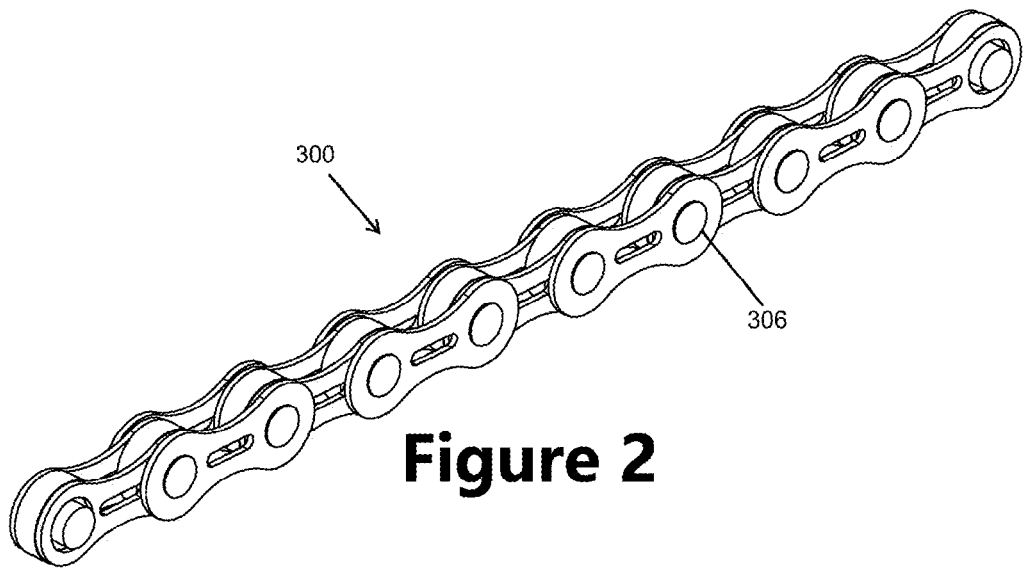
FIG. 2 is a side perspective view of a segment of a conventional roller chain.
Figure 3:
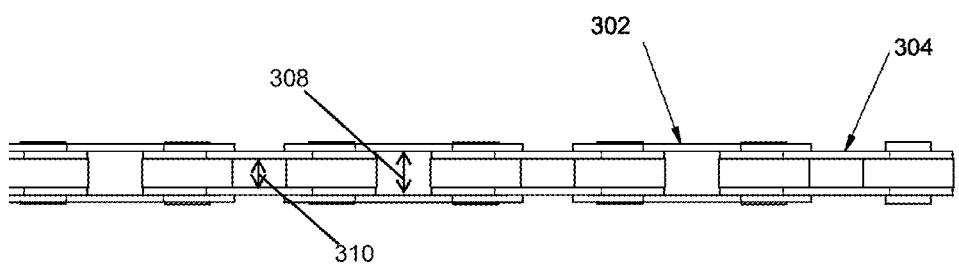
FIG. 3 is a top view of a segment of the roller chain of FIG. 2.
Figure 4:
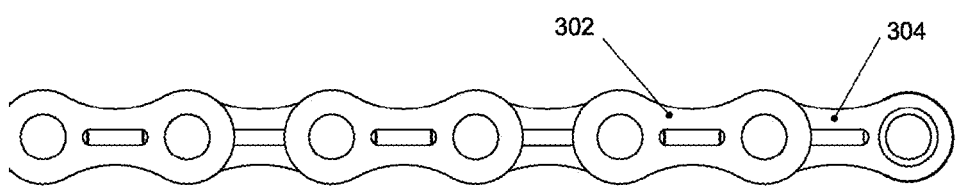
FIG. 4 is a side view of a segment of the roller chain of FIG. 2.
Figure 5:
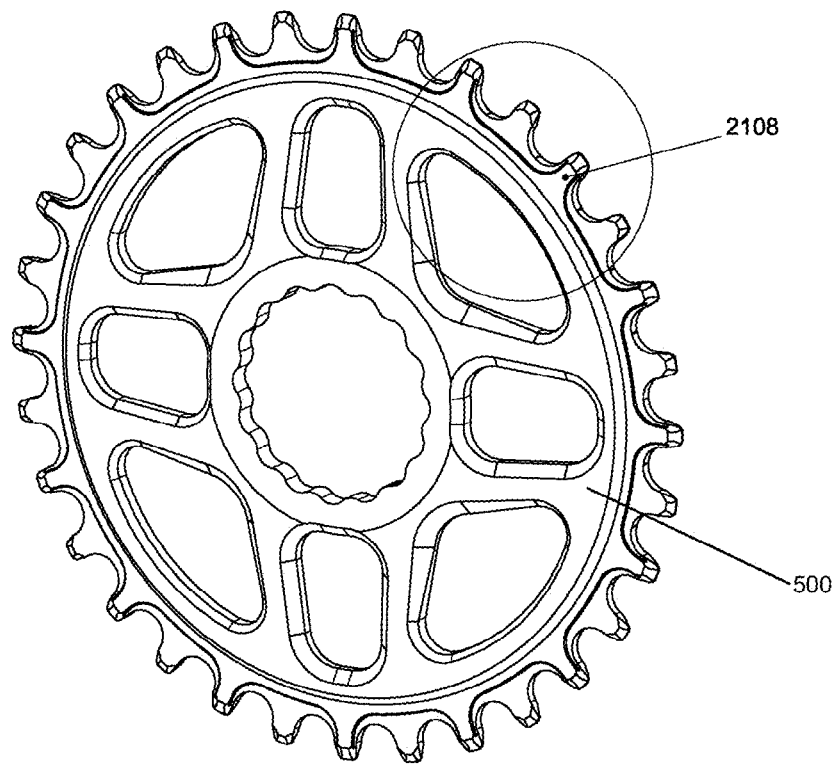
FIG. 5 is a right side perspective view of an embodiment of a chainring of the invention.

The chain may be a typical chain 100 known in the industry and formed of alternating outer links 302 and inner links 304 spaced parallel from one another as illustrated in FIGS. 2-4. Pairs of parallel outer links 302 may be pivotally coupled to adjacent pairs of parallel inner links 304 through a pivot pin 306. Any number of outer 302 and inner links 304 may be coupled to one another to form a chain 100 of the appropriate length for the application. Once the appropriate length of the chain 100 is determined, the links 302, 304 of the chain may be coupled together to form a closed loop that is directed around the chainring and sprocket of the bicycle. The space between the outer links 302 may have a wide width cavity 308 there between while the space between the inner links 304 may have a narrow width cavity 310 there between. The wide width 308 may be wider than the narrow width 310. In use, the chain 100 wraps partially around a chainring coupled to a crankset and back around a sprocket of a rear wheel. When a user applies torque to the crankset through pedaling, the teeth of the chainring contact the pivot pins 306 and transfer the torque to teeth of the sprocket of the rear wheel which in turn rotates the rear wheel.

Figure 6:
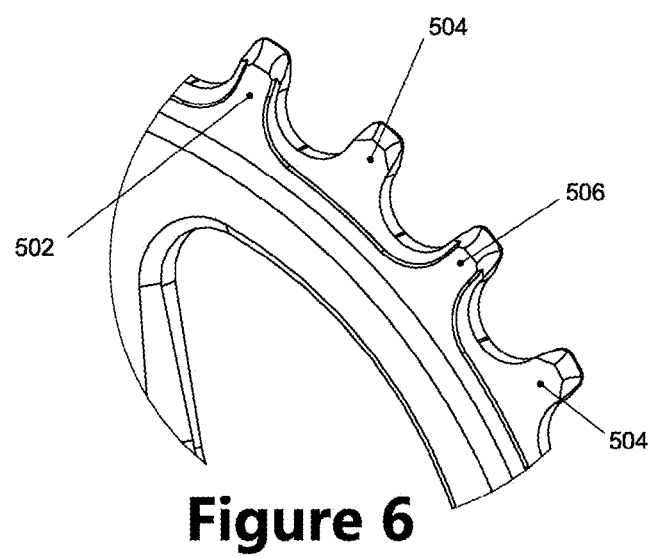
FIG. 6 is an enlarged view of a portion of a periphery of the chainring as shown in FIG. 5.
Figure 8:
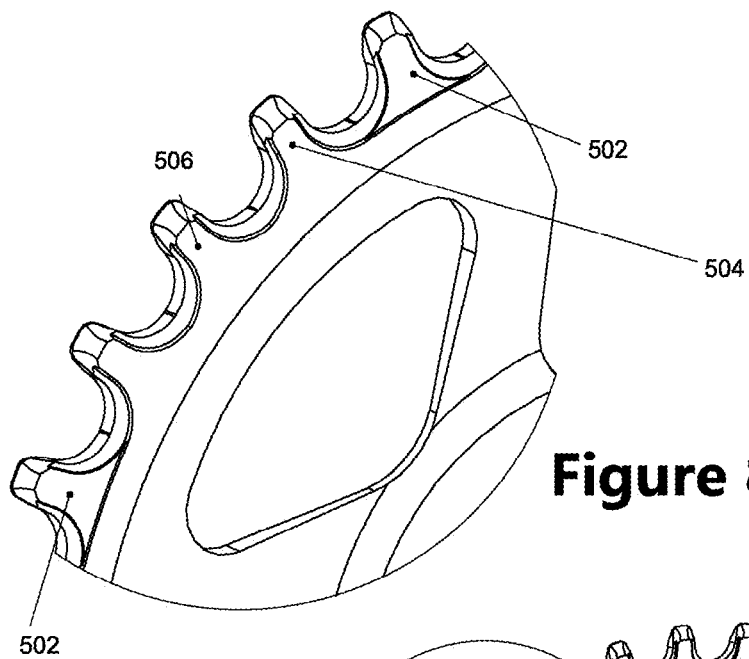
FIG. 8 is an enlarged view of a portion of a periphery of the chainring as shown in FIG. 7.
Figure 7:
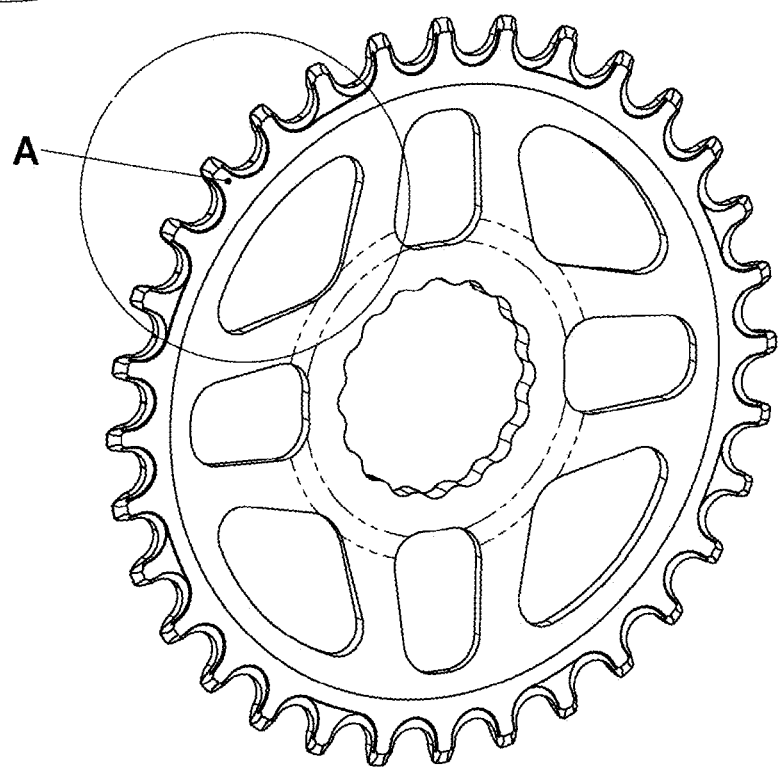
FIG. 7 is a left side perspective view of the chainring of the invention
Figure 9:
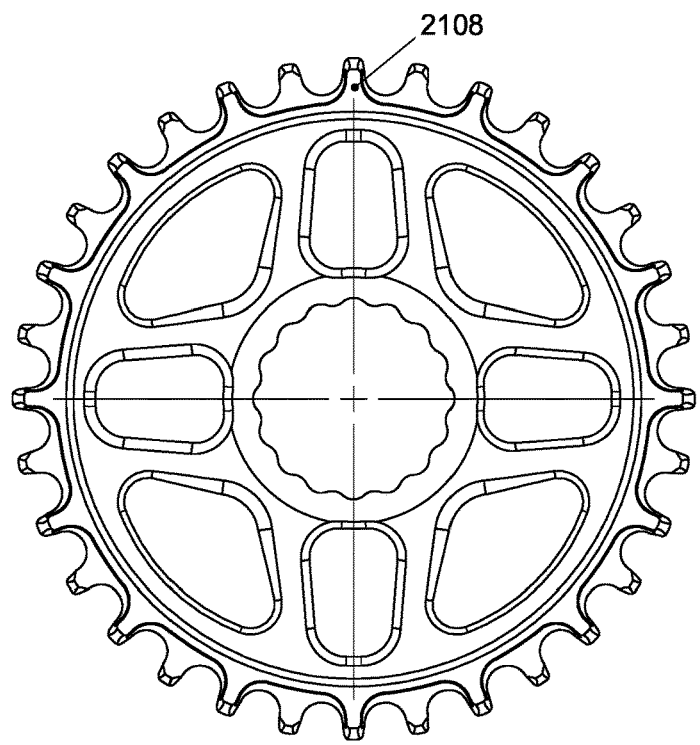
FIG. 9 is a right side view of the chainring of the invention.
Figure 10:
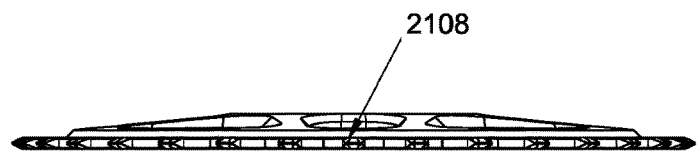
FIG. 10 is a top view of the chainring of the invention.
Figure 11:
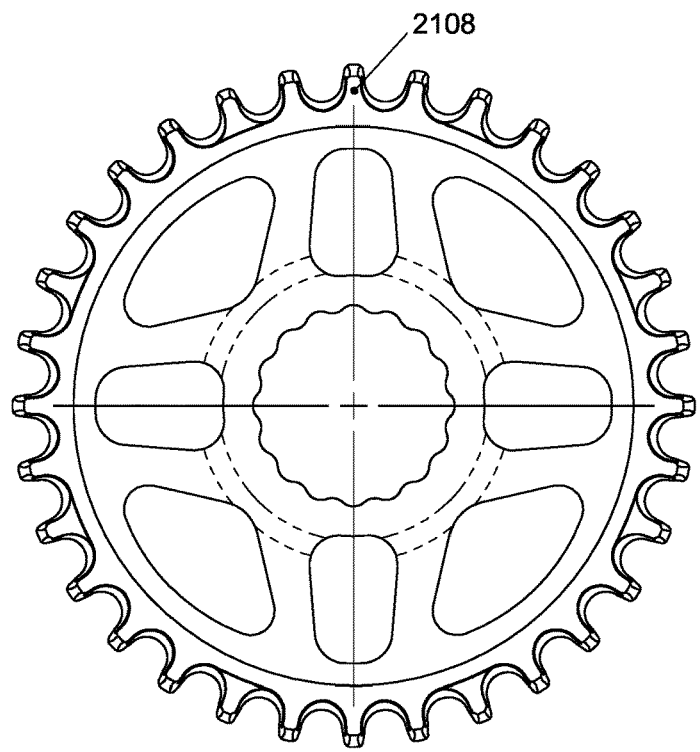
FIG. 11 is a left side view of the chainring of the invention.
Figure 13:
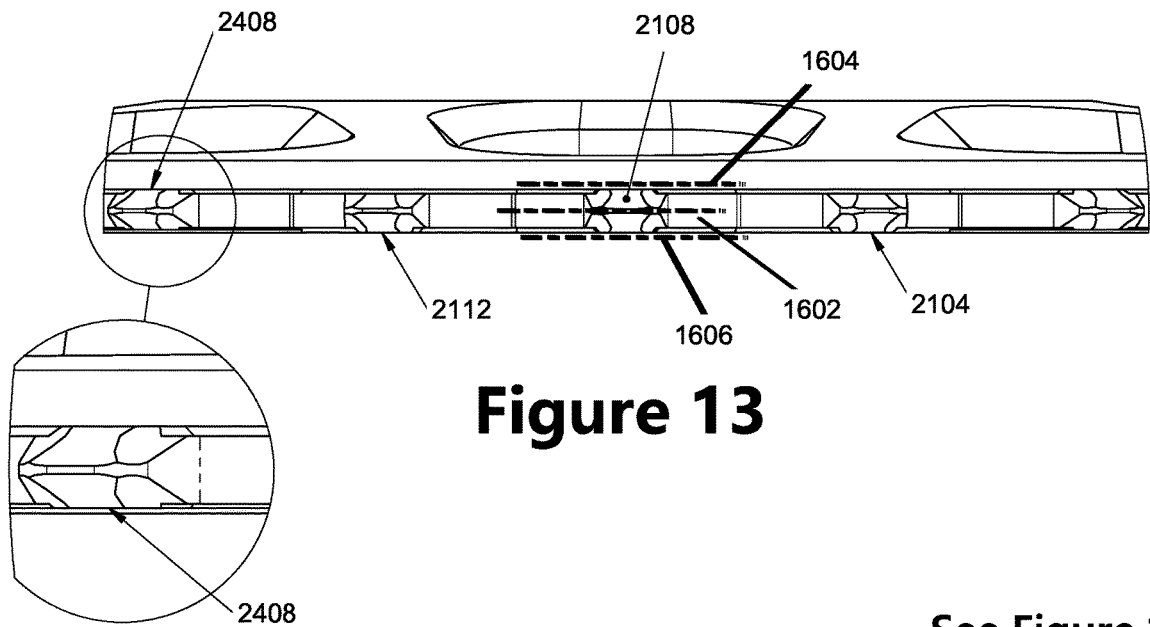
FIG. 13 is an enlarged view of a portion of the chainring as shown in FIG. 12.
Figure 12:
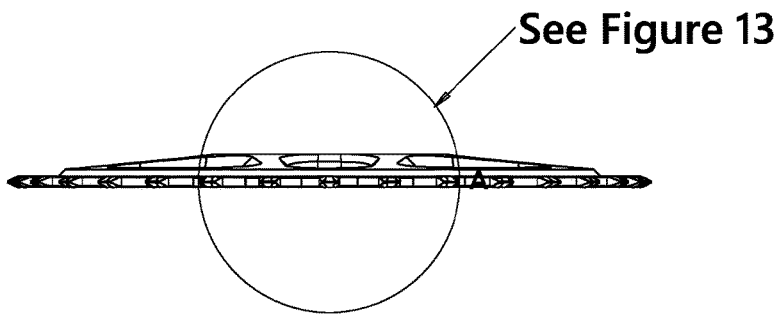
FIG. 12 is a top view of the chainring.
Figure 14:
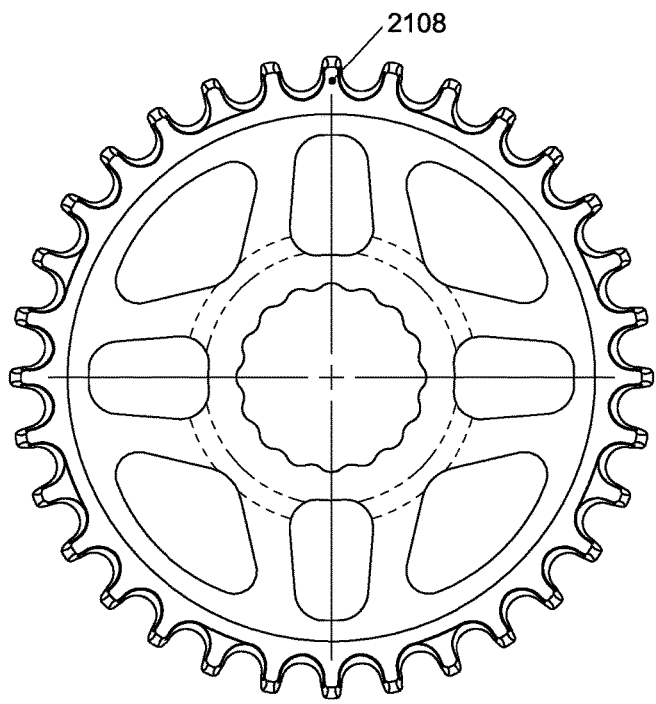
FIG. 14 is a right side view of an embodiment of the chain drive of the invention.
Figure 16:
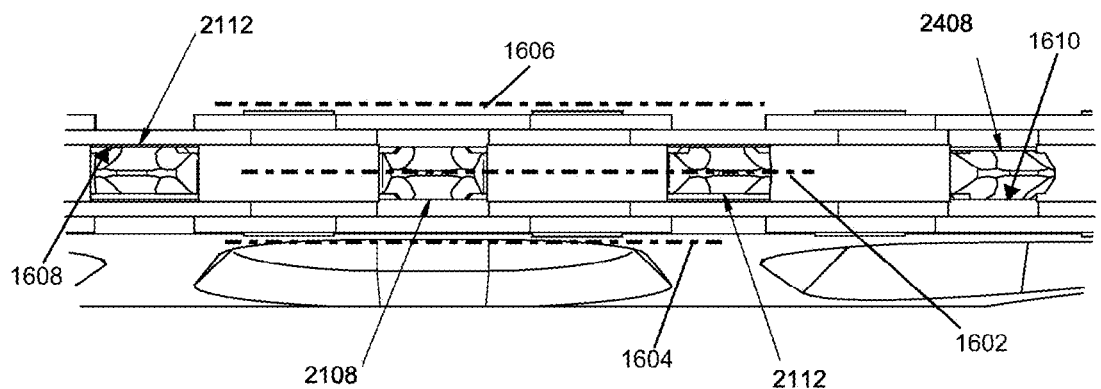
FIG. 16 is an enlarged view of a portion of the chainring and chain shown in FIG. 15.
Figure 15:
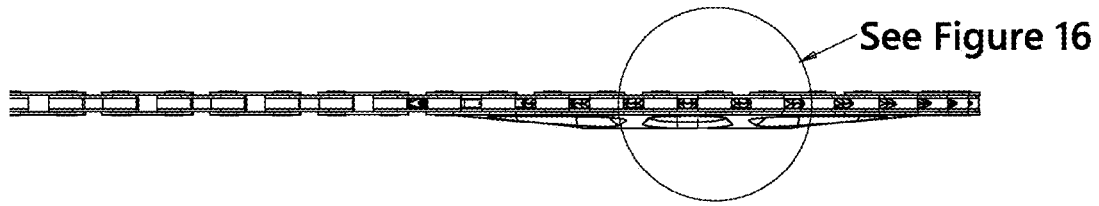
FIG. 15 is a top view of a chainring of this disclosure with a chain partially thereon.
Figure 17:
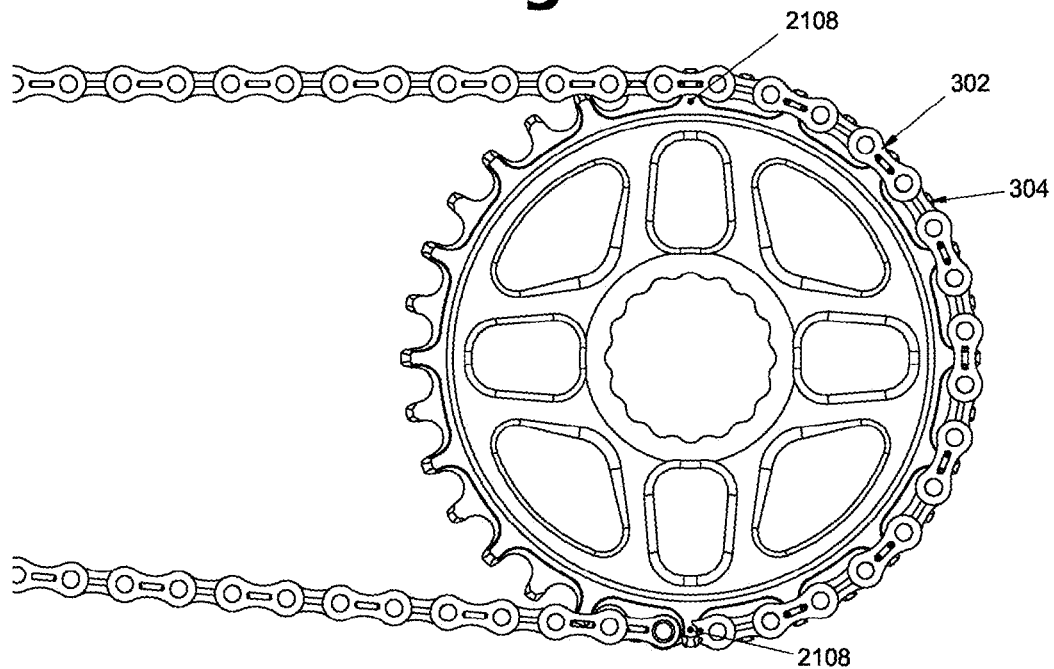
FIG. 17 is right side view of an embodiment of the chain drive of this disclosure with a chain thereon.
Figure 19:
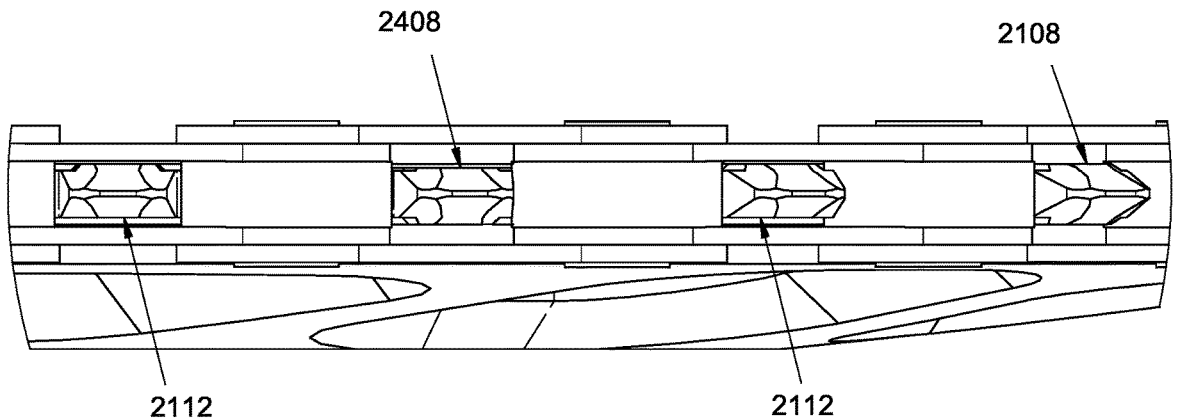
FIG. 19 is an enlarged view of the chainring and chain of FIG. 18.
Figure 18:
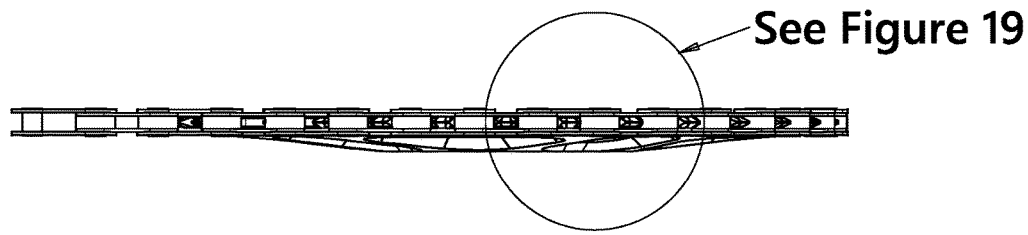
FIG. 18 is a top view of another embodiment of a chainring with a chain thereon.
Figure 20:
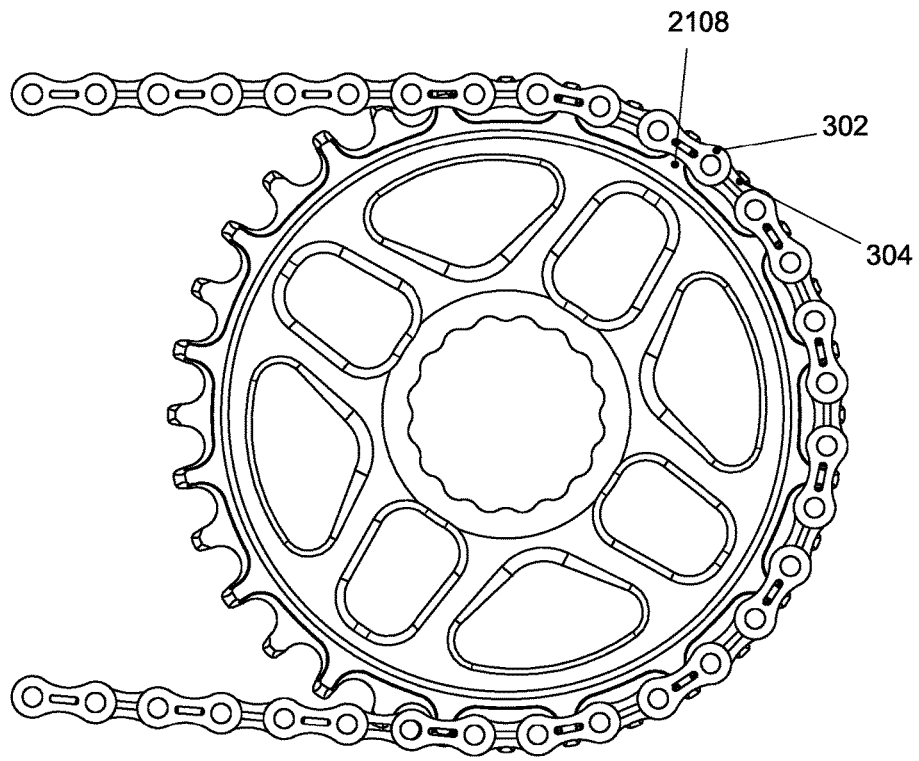
FIG. 20 is a side view of the chainring and chain from FIG. 18.

Referring now to FIGS. 5-20, different embodiments of a chainring of this disclosure are illustrated having combinations of full wide teeth and offset teeth arranged about the chainring. More specifically with reference to FIGS. 6 and 8, one embodiment of a chainring 500 of this disclosure is illustrated. The chainring 500 has teeth that are offset right 502, offset left 504, and teeth that are full 506. The chainring 500 may have a central plane 1602 formed substantially parallel to, and between, a first plane 1604 and a second plane 1606. The first plane 1606 may be defined along an inner surface of a chain link 302, 304 of a cavity 308, 310 while the second plane 1604 may be defined along an inner surface of an opposite chain link 302, 304 of the cavity 308, 310 when a corresponding chain 300 is properly positioned along the chainring 500 In other words, the central plane 1602 runs substantially through the center of any chain 300 properly positioned and tensioned around the chainring.

The offset wider right teeth 502 may have a section that is at least partially offset to the right, of the central plane 1602. The offset wider right teeth 502 may contact or otherwise be biased towards the first plane 1604 of the corresponding cavity 308 of the chain when positioned therein. Further, the offset wider right teeth 502 may provide at least a slightly spaced portion in the cavity 310 of the chain when properly positioned therein. In this configuration, a portion of the offset wider right teeth 502 may contact or otherwise be positioned adjacent to the inner side surface 1610 of the chain when positioned thereon but be at least slightly spaced from an inner surface 1608 of the chain. This allows the side surface 1610 of the offset wider right 502 teeth to maintain the proper aligning of the chain while providing a gap on the inner surface 1608 to allow debris and the like to be cleaned from the cavity 308, 310 of the chain.

Similarly, the chainring 500 may have offset left teeth 504 positioned there around as well. The offset left teeth 504 may be offset or biased towards the one side of the central plane 1602. The offset left teeth 504 may contact or otherwise be biased towards the one side of the corresponding cavity 308, 310 of the chain when positioned therein. Further, the offset left teeth 504 may be at least a slightly spaced from the side surface 1610 in the cavity 308, 310 of the chain when properly positioned therein. In this configuration, a portion of the offset left teeth 504 may contact or otherwise be positioned adjacent to the inner surface 1608 of the chain cavity 308, 310 when positioned thereon but be at least slightly spaced from the inner side surface 1610 of the chain cavity 308, 310. This allows the side surface of the offset left teeth 504 to maintain the proper aligning of the surface 1608 of the chain while providing a gap along the side surface 1610 to allow debris and the like to be cleaned from the cavity 308, 310 of the chain.

The chainring 500 may also have one or more full teeth 506. The full teeth 506 may be sized to substantially span the width of the cavity 308, 310 formed between pairs of chain links. The full teeth 506 may be sized to have a width at or around the base of the full teeth 506 that is about the width of the corresponding cavity 308, 310 formed in the chain such that the chain does not have substantial room to slide relative to the central plane 1602 during use.

Figure 21:
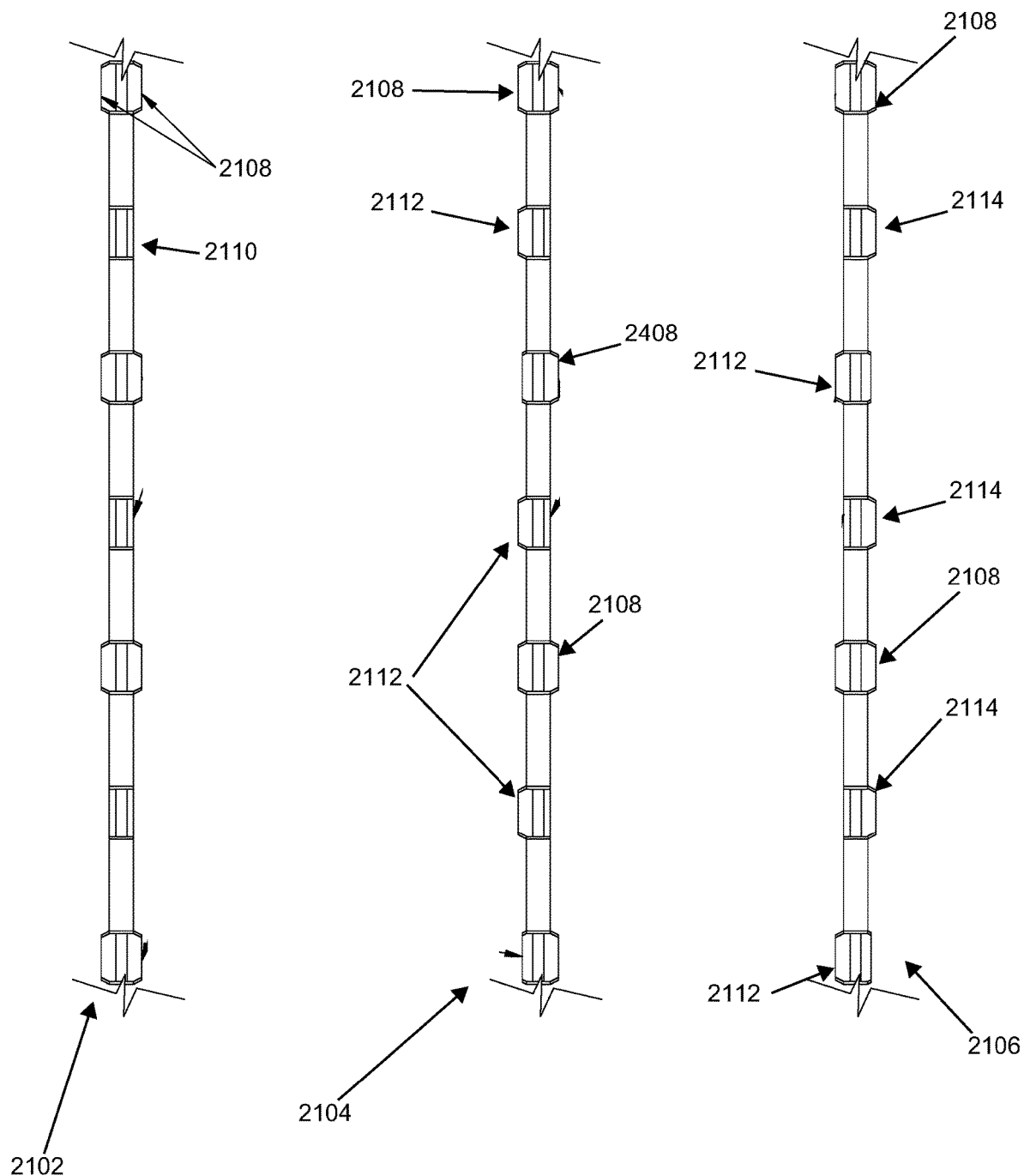
FIG. 21 is a comparison of a Narrow-Wide chainring configuration and a Custom-Wide configuration of this disclosure.
Figure 23:
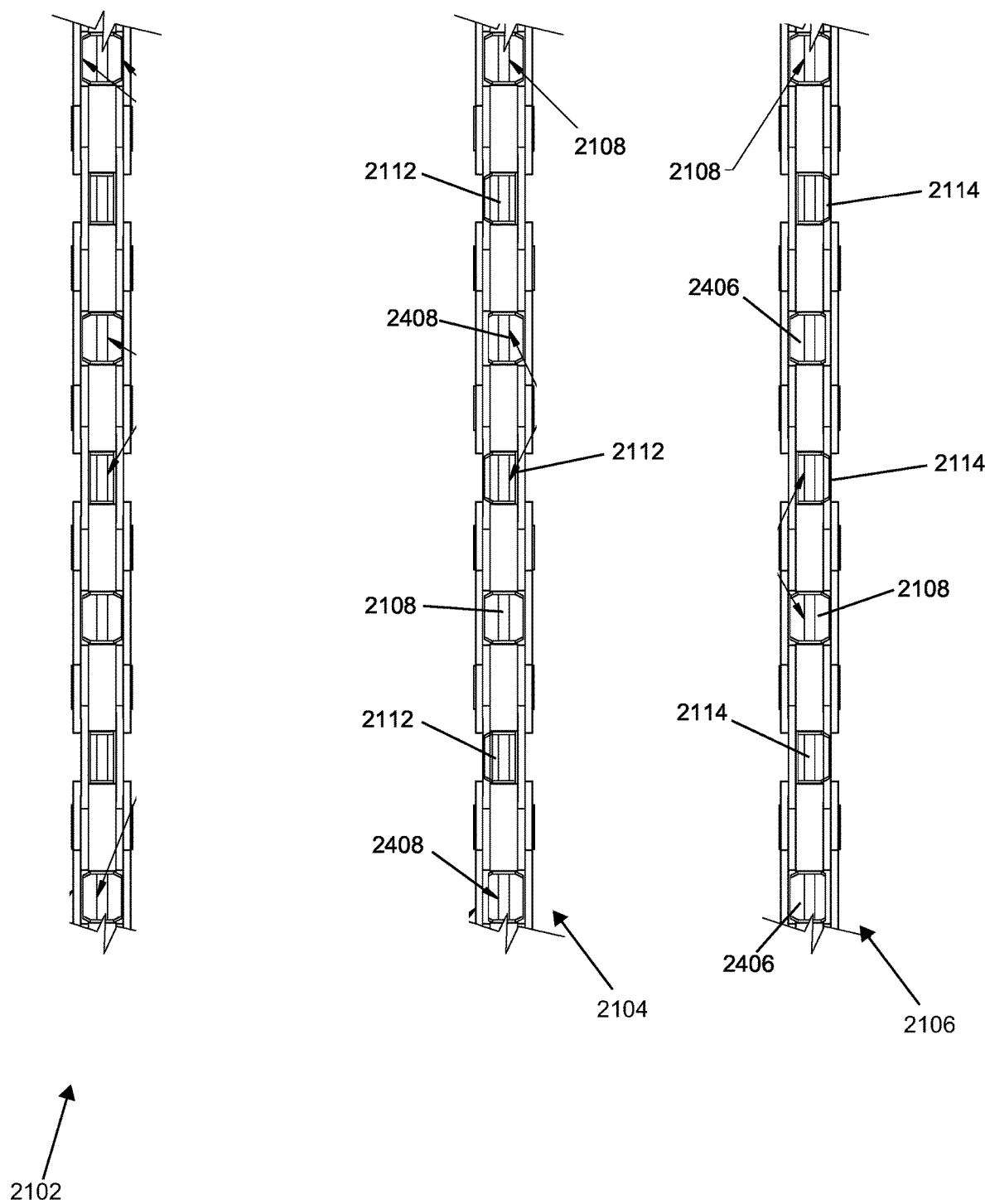
FIG. 23 is an illustrative embodiment of another traditional tooth configuration compared to one embodiment of a custom-wide configuration contemplated herein.

Referring now to FIGS. 21 and 23, a conventional chainring tooth arrangement 2102 is illustrated adjacent to one embodiment of this disclosure of a chainring having an offset left 2104 bias and one embodiment of this disclosure of a chainring having an offset right 2106 bias. FIG. 23 illustrates the same with a chain overlaid to more clearly illustrated the position of the teeth within the cavity of the chain. The conventional chainring tooth arrangement 2102 may be a wide tooth 2108 followed by a narrow tooth 2110. The full wide tooth 2108 may have a width that is about as wide as the cavity 308 and the narrow tooth 2110 may have a width that is about as wide as cavity 310. In this configuration, the full wide tooth 2108 can fit within the cavity 308 while being positioned adjacent to corresponding chain links to prevent substantial side movement of the chain. Similarly, the narrow wide tooth 2110 can fit within the cavity 310 while being positioned adjacent to corresponding chain links to prevent substantial side movement of the chain 300.

The tooth pattern of the conventional chainring 2102 may alternate between the wide tooth 2108 and the narrow tooth 2110 about the entire radius of the chainring 2102. The wide tooth 2108 may be sized to substantially span the width of the corresponding cavity 308 of the chain when positioned therein while the narrow tooth 2110 may be sized to span the width of the adjacent chain link surfaces when positioned in the cavity 310 of the chain 300.

Figure 22:
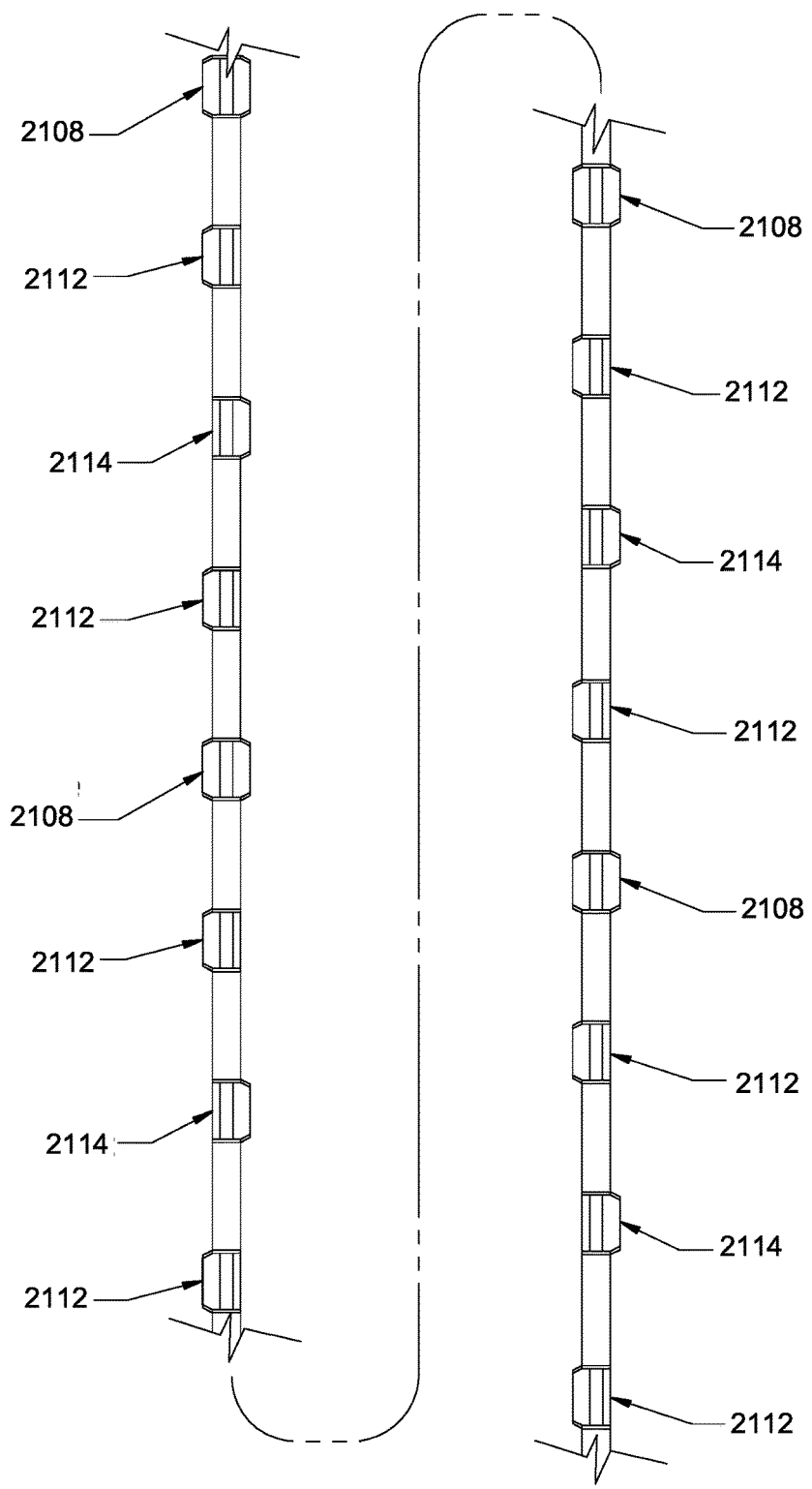
FIG. 22 is an illustrative embodiment of one tooth arrangement configuration of this disclosure.

The chainring having an offset left 2104 is one embodiment of this disclosure having full wide teeth 2108, offset left teeth 2112, and offset wide right teeth 2114 in a pattern about the chainring 2104. More specifically, the teeth may alternate in type as follows: full wide tooth 2108, offset left tooth 2112, offset wide right tooth 2114, and offset left tooth 2112. This pattern can repeat about the chainring 2104. FIG. 22 illustrates a repeated pattern of the offset left chainring 2104.

As used herein, a full wide tooth 2108 is a tooth that has a width that is about the same as the width of the larger cavity 308 of the chain 300. The offset left tooth 2112 has an offset to one side of the small cavity 310 so the offset side is positioned adjacent to a chain link while the opposite side is at least partially spaced from the opposing chain link. The offset wider right tooth 2408 has an offset to an opposite side relative to the offset left tooth 2112 of the larger cavity 308 so the offset side is positioned adjacent to a chain link in the larger cavity 308 while the opposite side is at least partially spaced from the opposing chain link. Accordingly, the term "offset wider" right or left may refer to an offset sized to fit in the larger cavity 308 of the chain 300 while the term "offset left" or "offset right" may refer to an offset sized to be positioned in the smaller cavity 310.

Alternatively, the offset right chainring 2106 may also have alternating teeth types. More specifically, the offset right chainring 2106 may have the following pattern: full wide tooth 2108, offset right tooth 2114, offset left tooth 2112, offset right tooth 2114. This pattern can repeat about the chainring 2106.

Figure 24:
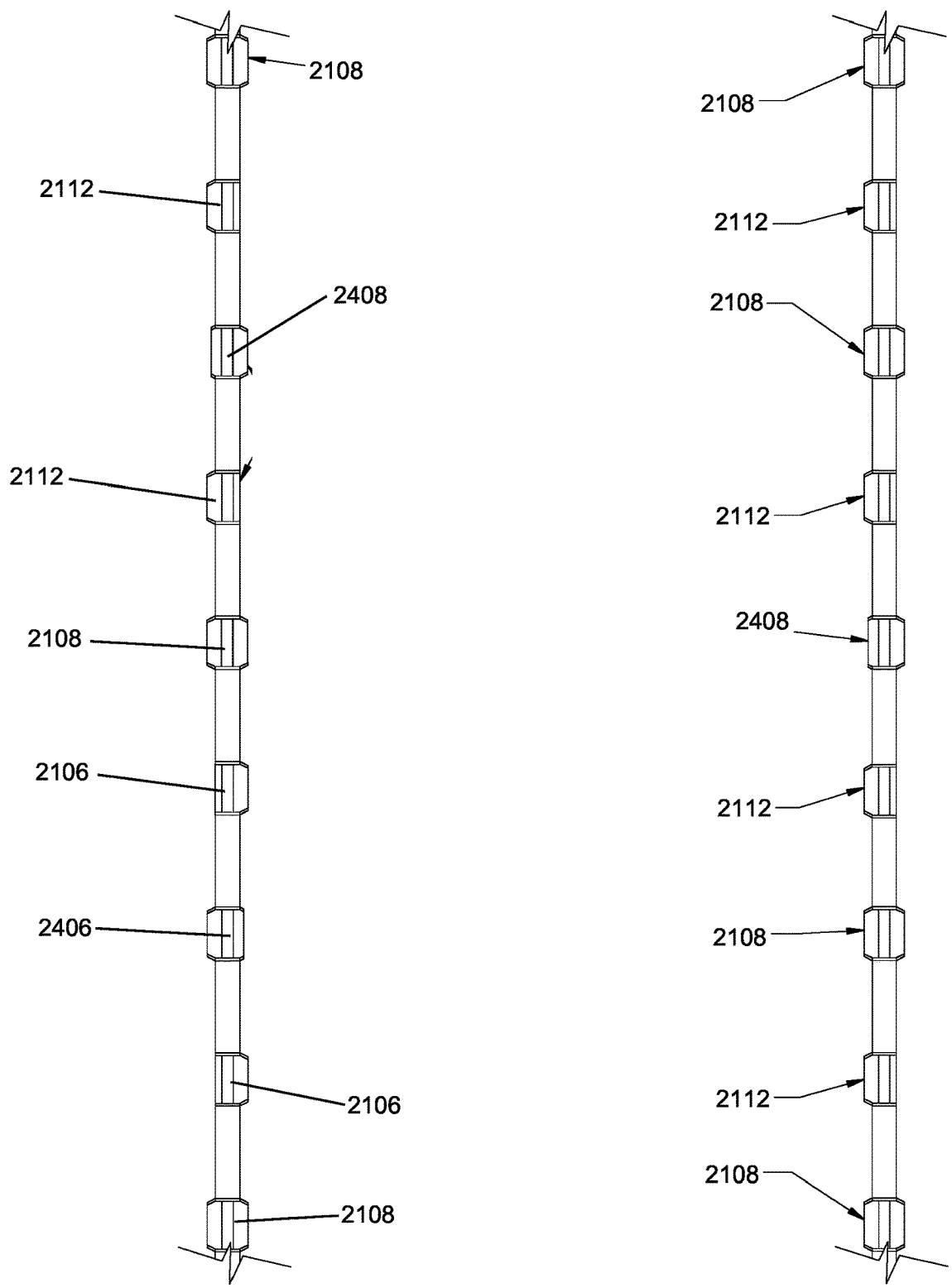
FIG. 24 is an illustrative embodiment of one tooth arrangement configuration of this disclosure.

Referring now to FIG. 24, two more chainring embodiments 2402, 2404 are illustrated. One chainring 2402 may have the following tooth pattern: full wide tooth 2108, offset left tooth 2112, offset wide right tooth 2408, offset left tooth 2112, full wide tooth 2108, offset right tooth 2114, offset wider left 2406, offset right 2114. This pattern can repeat about the chainring 2402.

Chain ring 2404 may also have a unique tooth pattern. More specifically, the chain ring 2404 may arrange the teeth in the following pattern: offset left tooth 2112, full wide tooth 2108, offset left tooth 2112, offset wider right tooth 2408, offset left tooth 2112, offset wider right tooth 2408, offset left tooth 2112. This pattern can continue about the chainring 2404.

In one aspect of this disclosure, each tooth of the chainring may be specifically sized to fit within either the wide cavity 308 or the narrow cavity 310 of the chain. In other words, the offset teeth may be offset to be positioned substantially adjacent to the inner surface of the chain link of the cavity within which the tooth is supposed to be positioned. For example, an offset left tooth 2112 may be offset sufficiently left to become adjacent to the corresponding inner surface of the chain in the narrow cavity 310. Alternatively, the offset wider left tooth 2406 may be offset sufficiently left to become adjacent to the corresponding inner surface of the chain in the wide cavity 310. That is to say, the offset wider left tooth 2406 may extend slightly farther to the left than the offset left tooth 2112. The offset right tooth 2114 and offset wider right tooth 2408 may be similarly sized to be appropriately offset for the corresponding cavity 308, 310 of the chain.

In view thereof, the teachings of this disclosure contemplate utilizing the appropriately sized full wide tooth and offset tooth for the corresponding cavity for which they are intended to be positioned. Accordingly, many different tooth combination are considered implementing the offset and pattern designs disclosed here.

Figure 25:
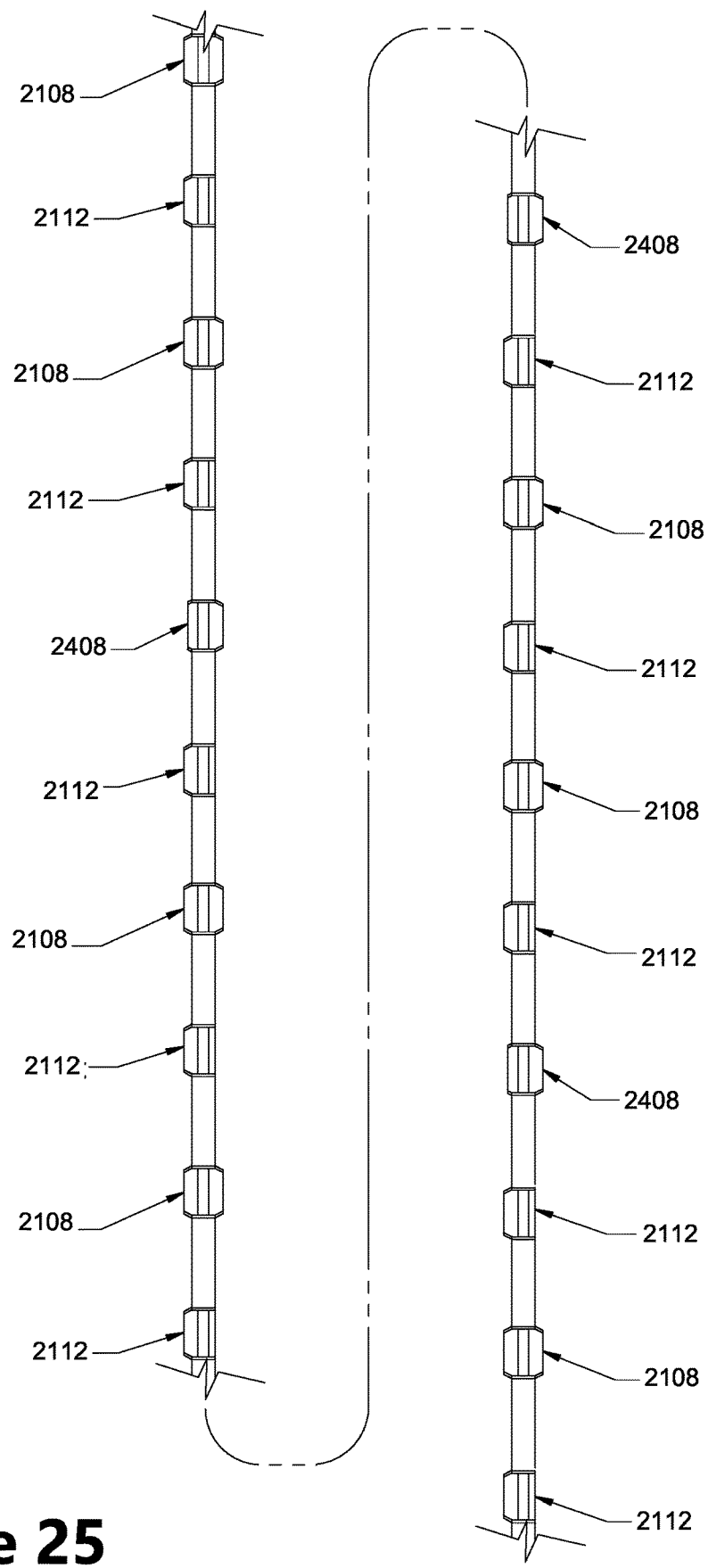
FIG. 25 is an illustrative embodiment of one tooth arrangement configuration of this disclosure.

Yet another embodiment of this disclosure is a chain ring 2500 illustrated in FIG. 25. The chain ring 25 may have a unique tooth pattern to ensure the chain stays properly positioned on the chainring 25 while also cleaning the cavities of the chain to prevent debris buildup and other issues that can affect proper tracking of the chain on the chainring 2500. More specifically, the chainring 2500 may have teeth arranged in the following pattern: full wide tooth 2108, offset left tooth 2112, full wide tooth 2108, offset left tooth 2112, offset wider right tooth 2408, offset left tooth 2112. This pattern may repeat about the chainring 2500.

The offset teeth allow dirt, mud, or other debris from clogging the chain in between the teeth and preventing or impeding the chain from fully meshing onto the ring among other thing. Further, the full wide teeth help to keep the chain aligned with the center of the rings teeth and provide enhanced chain retention among other things.

In the embodiments illustrated and described herein, the chain ring is shown having a direct mount. However, a person skilled in the art understands that a traditional mount style using a spider and specific Bolt Circle Diameter mount could alternatively be used. Accordingly, this disclosure contemplates using any known mounting system for the chainring.

In one aspect of this disclosure, the chain is permitted some lateral play on the offset teeth between the full wide teeth. This allows the chain to flex in the direction of the respective lateral force which will decrease the drag on the chain when pedaling. The full wide teeth help keep the chain aligned with the center of the ring's teeth and help prevent the dropping of the chain while riding in rough terrain. The offset wider teeth may provide some additional security to the chain's retention on the ring.

A person skilled in the art understands that in the configurations of the embodiments presented herein the number of teeth may be reduced or added by a quantity of two teeth to get the desired number of teeth (i.e., 30t, 32t, 34t, 36t, 38t, 40t, 42t, 44t etc.), the teeth removed or added depends on the embodiment or teeth configuration being used. The specific tooth pattern utilized will need to be appropriate for the number of teeth on the chainring.

Figure 26:
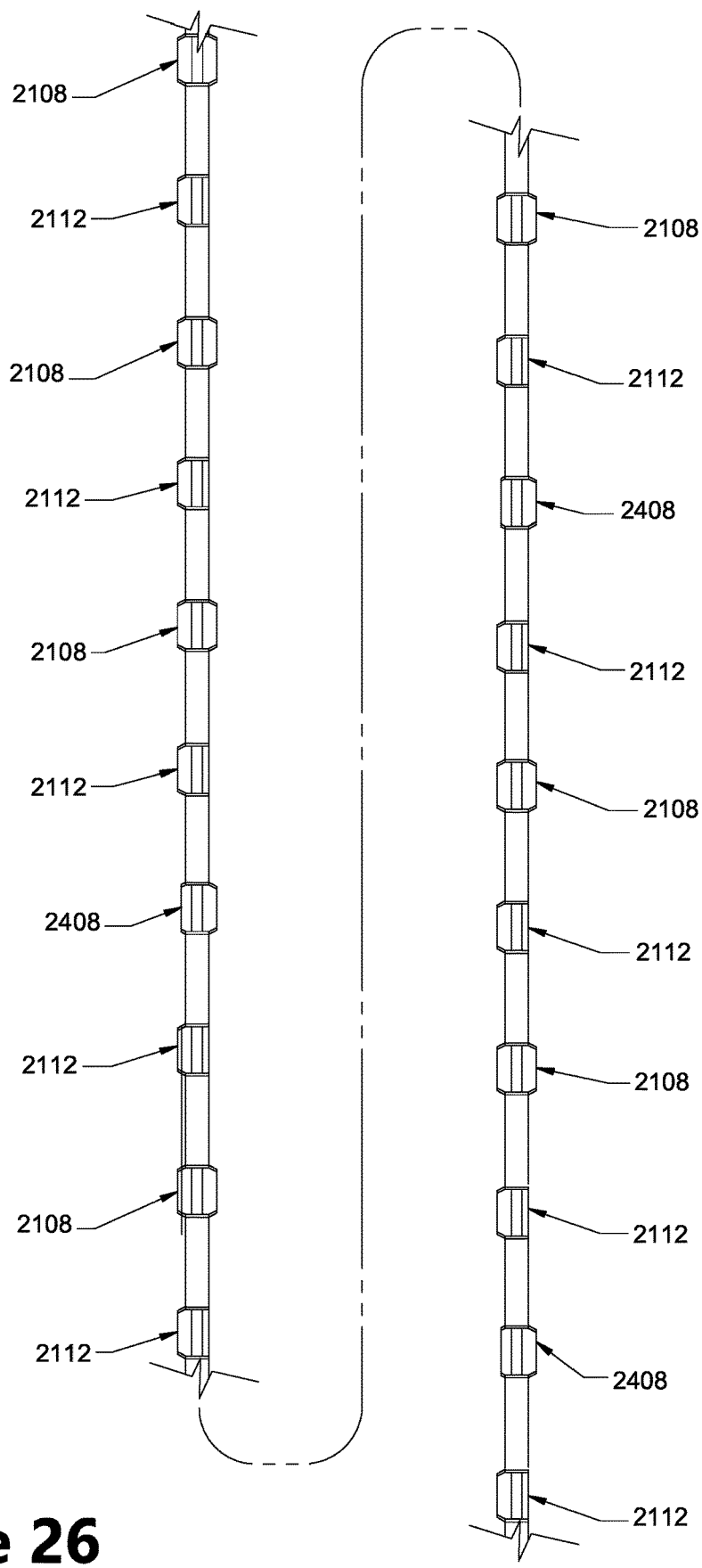
FIG. 26 is an illustrative embodiment of another tooth arrangement configuration of this disclosure.

Referring now to FIG. 26, yet another embodiment of this disclosure is illustrated. More specifically, FIG. 26 illustrates a chainring 2600 having 32 total teeth in a wide, offset left, offset right configuration. More specifically, one pattern may be a Full-Wide tooth followed by an Offset-Left tooth followed by a Full-Wide tooth followed by an Offset-Left tooth followed by a Full-Wide tooth. The following pattern repeats around the rest of the ring of an Offset-Left tooth followed by and Offset-Wider-Right tooth followed by an Offset-Left tooth followed by a Full-Wide tooth followed by an Offset-Left tooth followed by a Full-Wide tooth followed by an Offset-Left tooth followed by an Offset-Wider-Right tooth followed by an Offset-Left tooth followed by a Full-Wide tooth followed by an Offset-Left tooth followed by a Full-Wide. This pattern may continue around the chainring 2600 to accommodate the appropriate number of teeth. This pattern will be the same for a 32t, 36t, 40t, 44t, 48t, 52t with the three Full-Wide grouped together; Full-Wide, Offset-Left, Full-Wide, Offset-Left, Full-Wide then the normal pattern repeating.

The pattern described herein for the chain ring 2600 will be substantially the same for a 36 tooth, 40 tooth, 44 tooth, 48 tooth, and 52 tooth chain ring with the three Full-Wide tooth, Offset-Left tooth, Full-Wide tooth, Offset-Left tooth, Full-Wide tooth then the normal pattern repeating.

Figure 27:
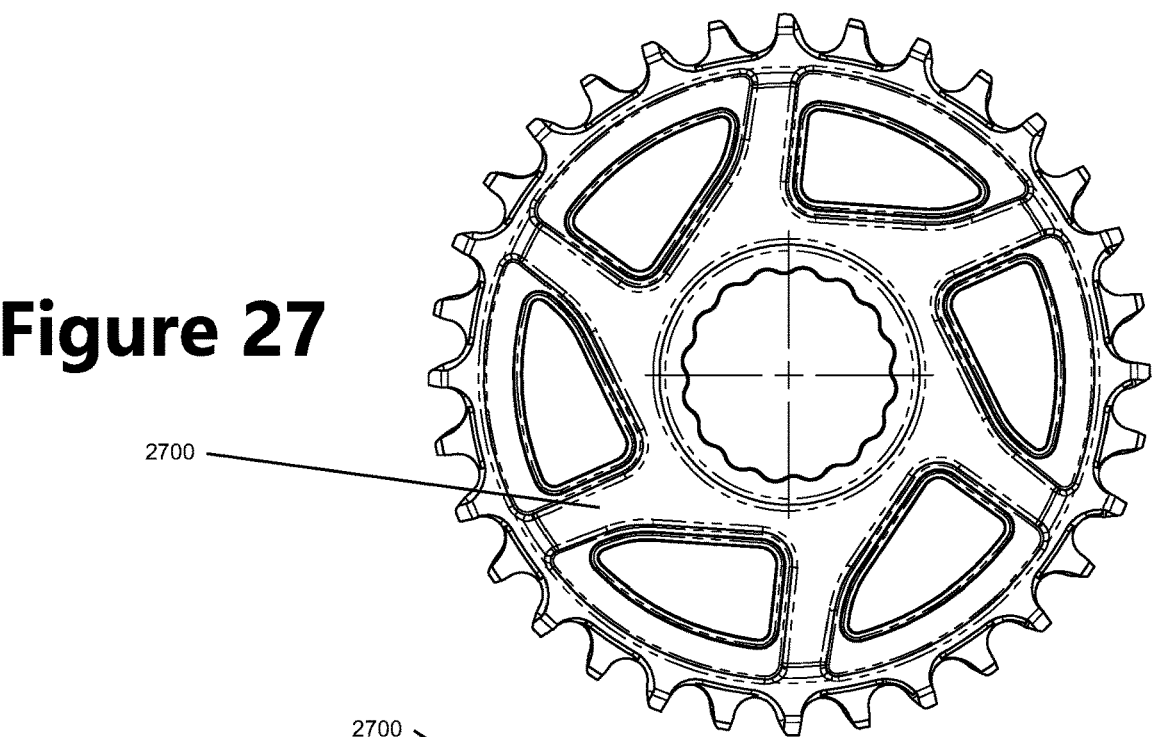
FIG. 27 is an illustrative embodiment of a chainring having an offset tooth arrangement and a curved tooth configuration.
Figure 28:
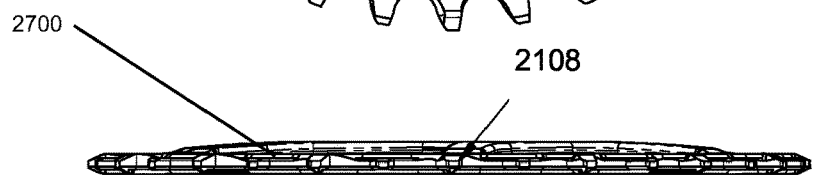
FIG. 28 is a top view of the chairing of FIG. 27.
Figure 29:
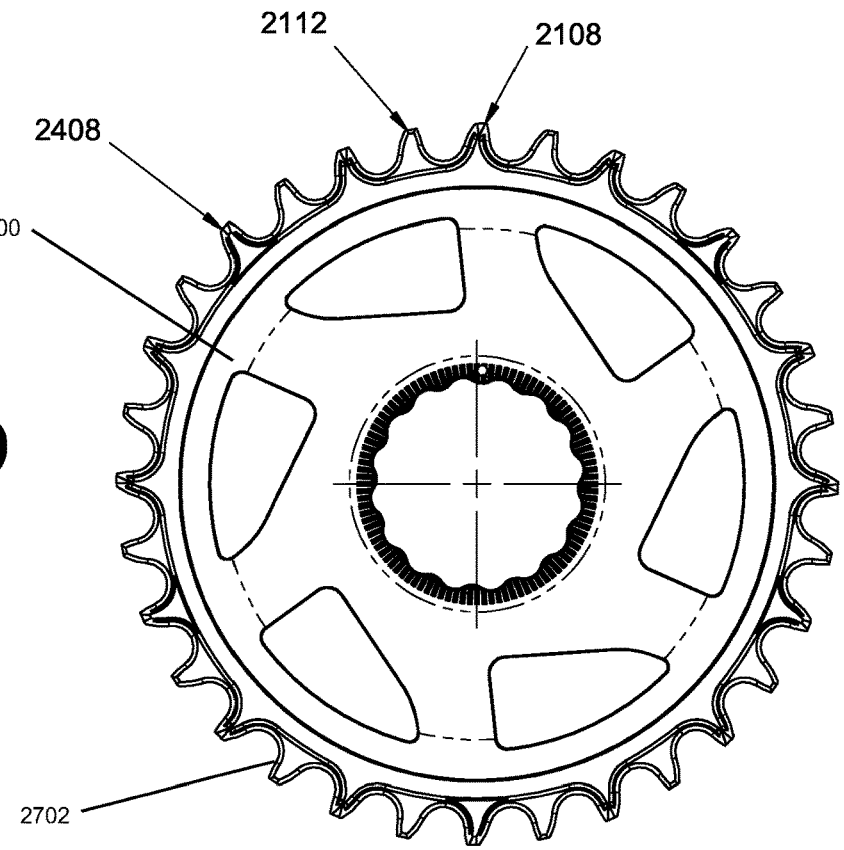
FIG. 29 is a back view of the chainring of FIG. 27.
Figure 31:
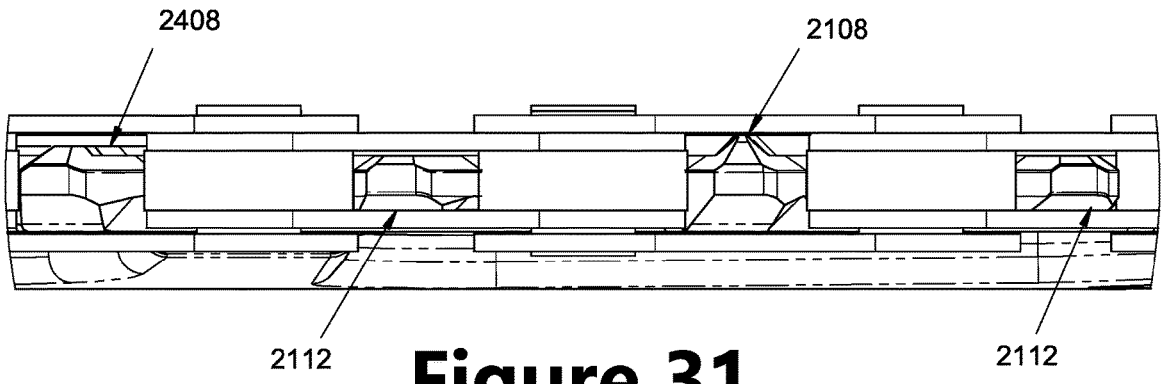
FIG. 31 is a detail section view of FIG. 30.
Figure 30:
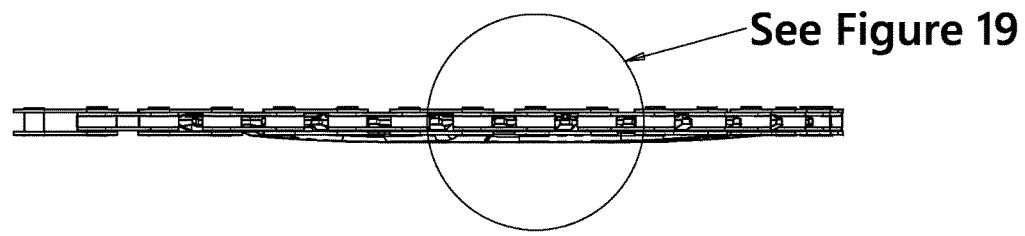
FIG. 30 is a top view of the chainring of FIG. 27 with a chain thereon.
Figure 32:
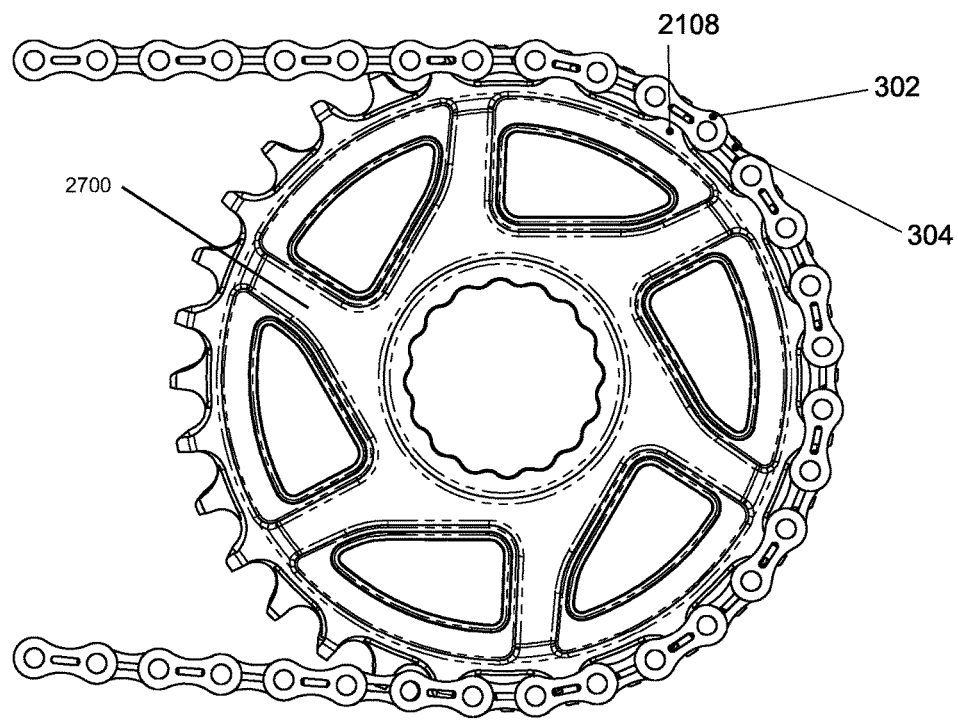
FIG. 32 is a side view of FIG. 30.
Figure 33:
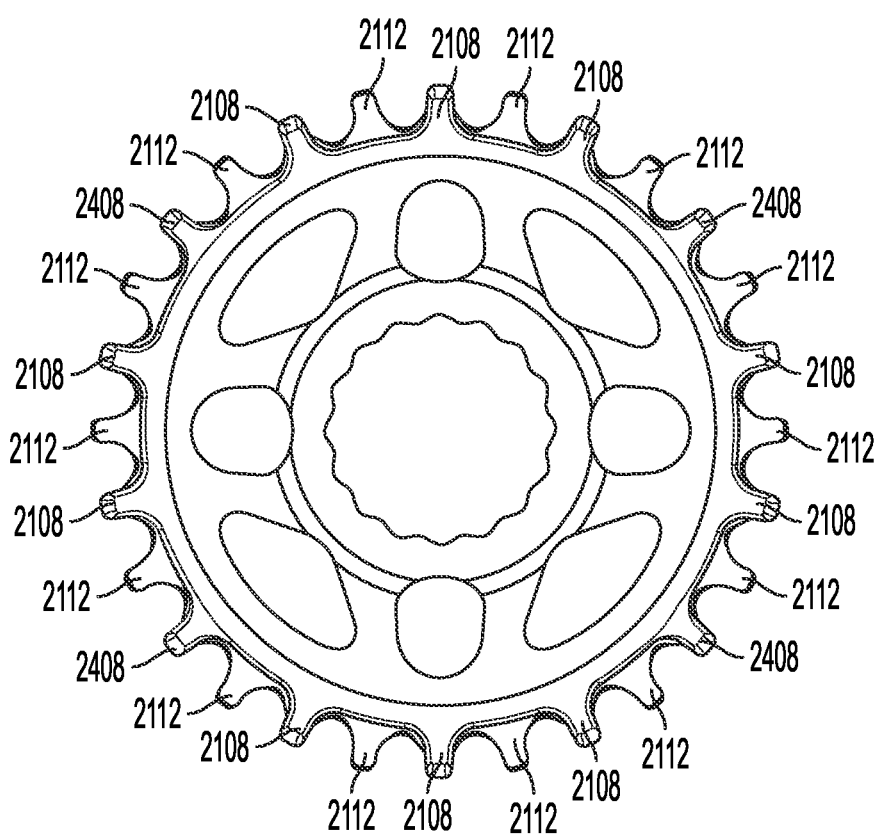
FIG. 33 is a side view of one embodiment of a 28 tooth chainring.
Figure 34:
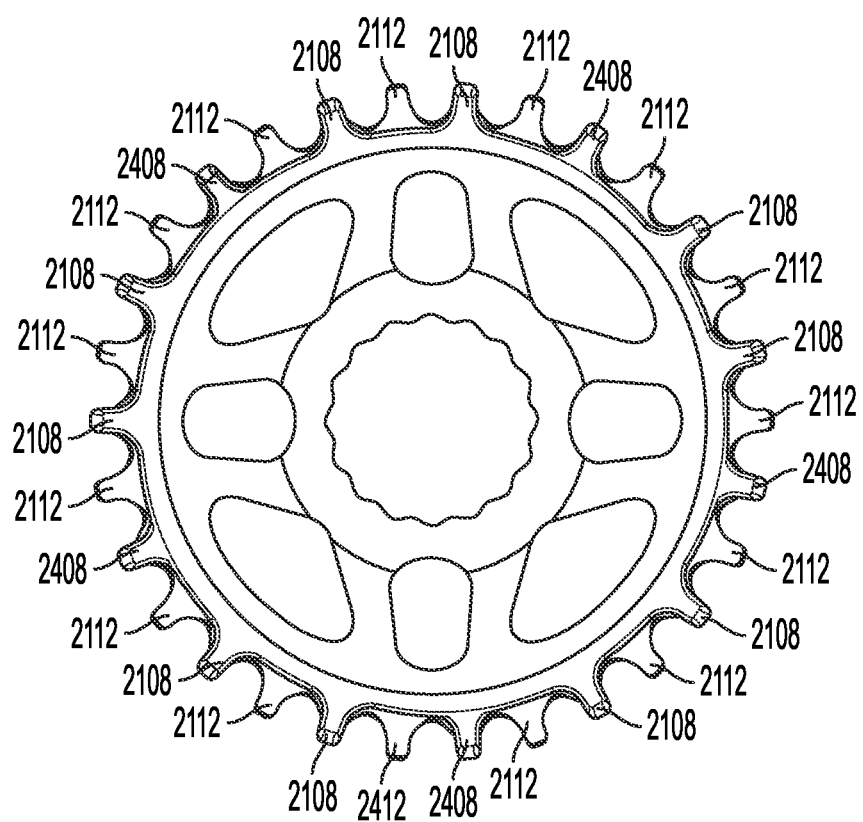
FIG. 34 is a side view of one embodiment of a 30 tooth chainring.
Figure 35:
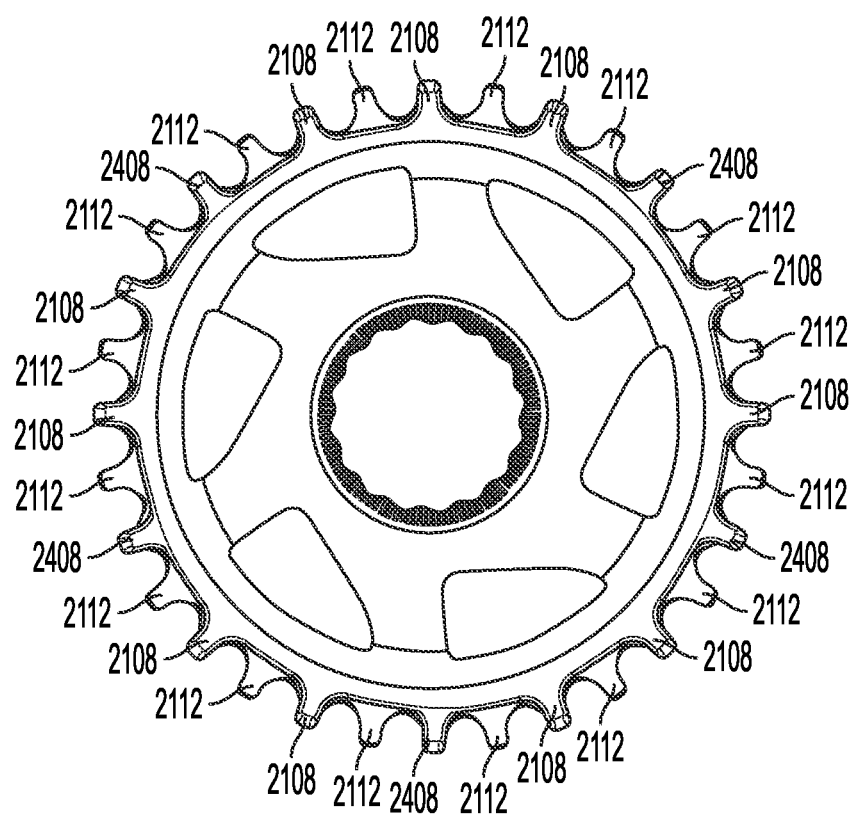
FIG. 35 is a side view of one embodiment of a 32 tooth chainring.
Figure 36:
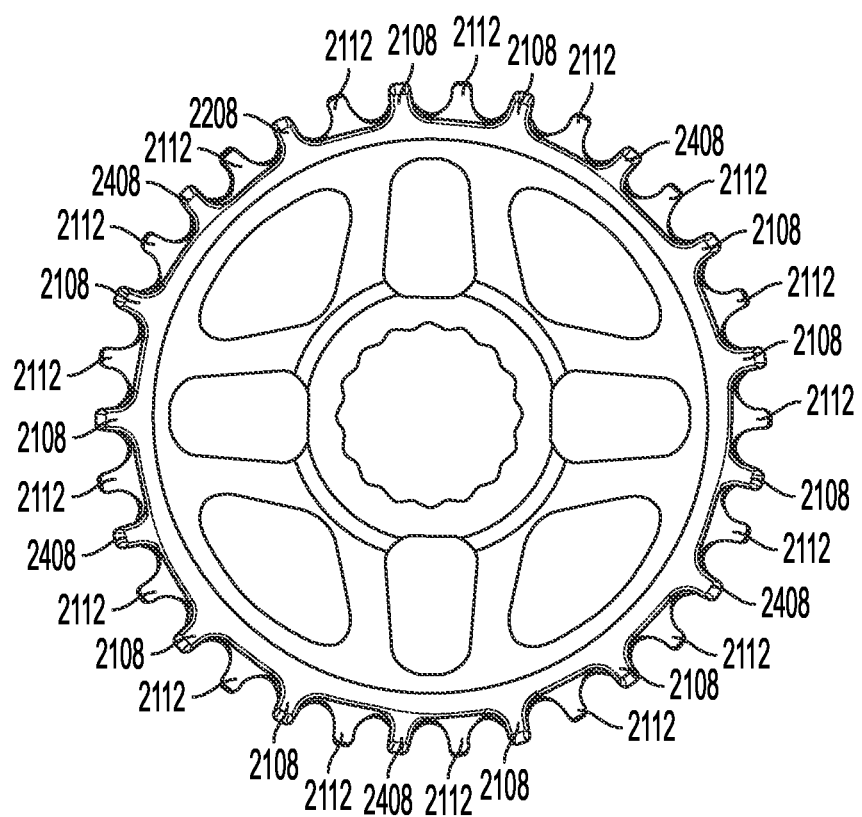
FIG. 36 is a side view of one embodiment of a 34 tooth chainring.
Figure 37:
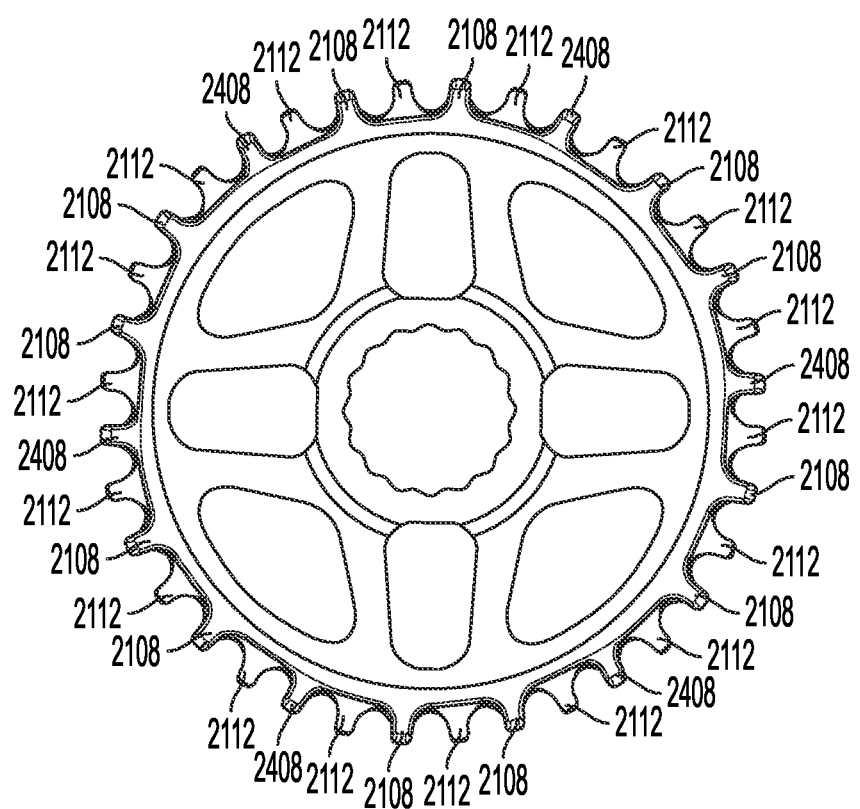
FIG. 37 is a side view of one embodiment of a 36 tooth chainring.
Figure 38:
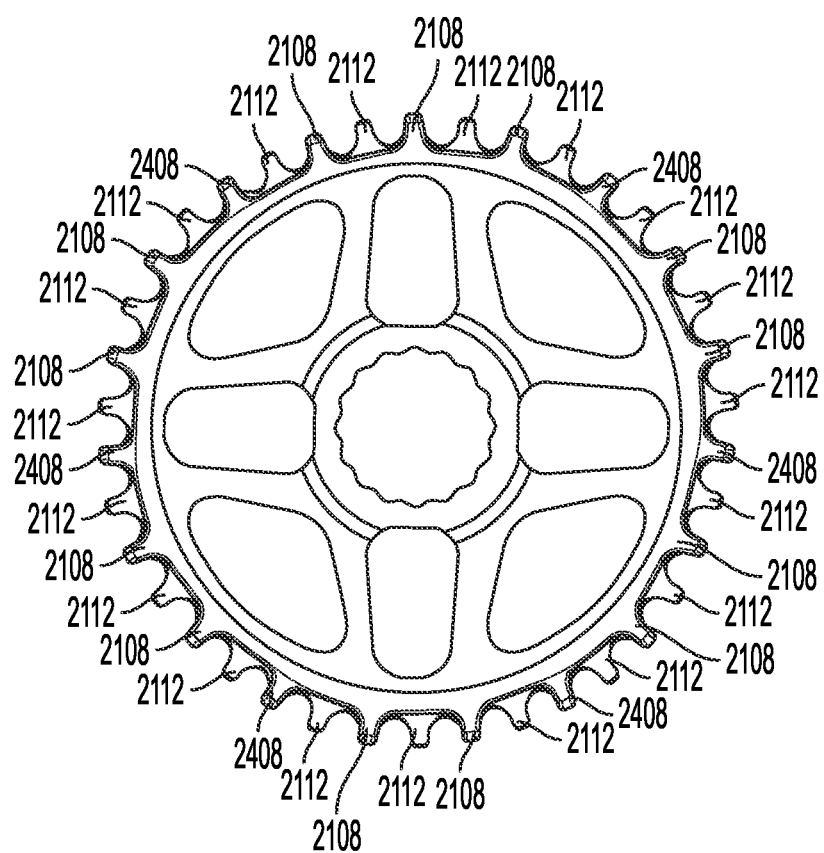
FIG. 38 is a side view of one embodiment of a 38 tooth chainring.
Figure 39:
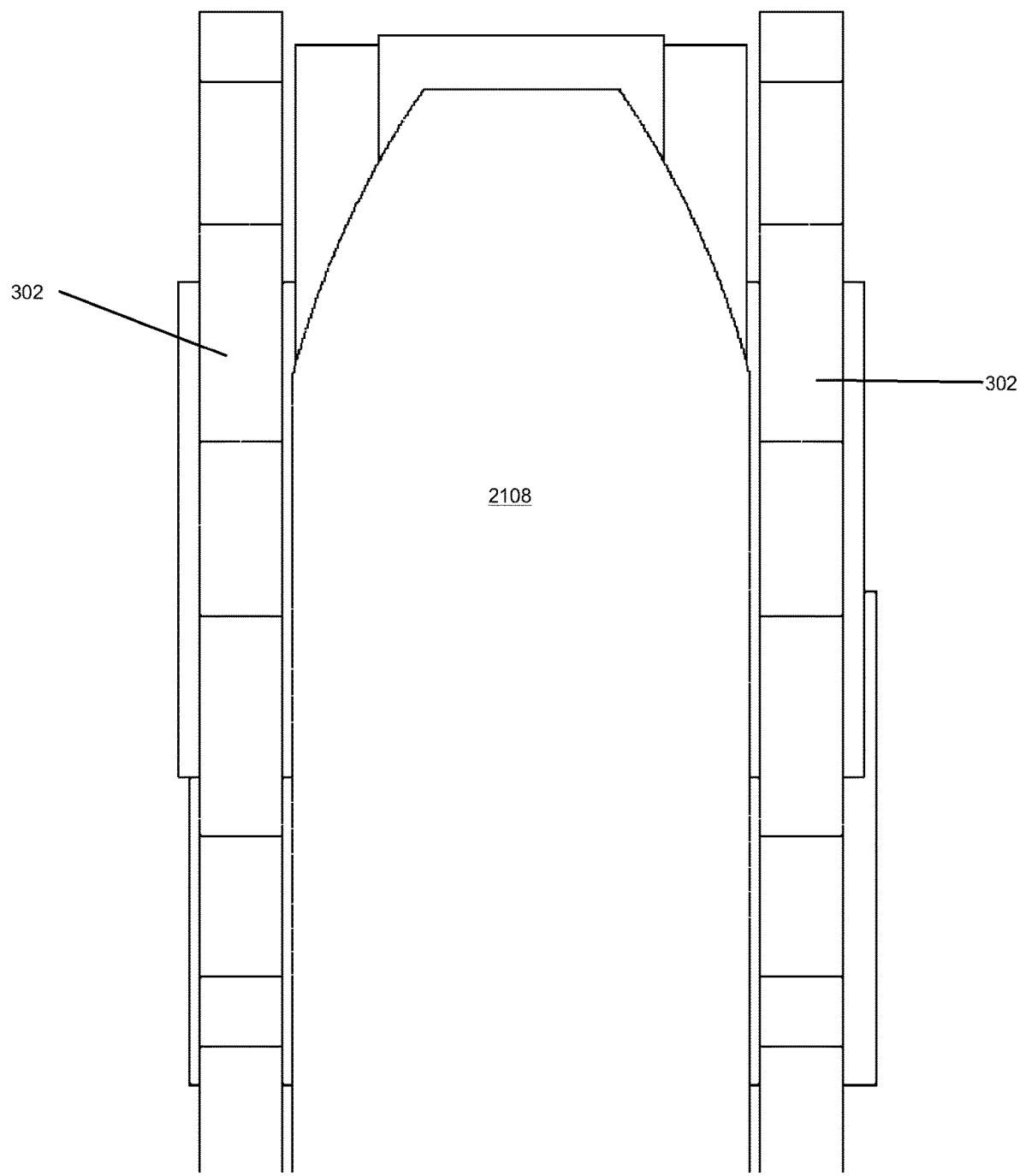
FIG. 39 is a section view through a full wide tooth of a chainring of this disclosure.
Figure 40:
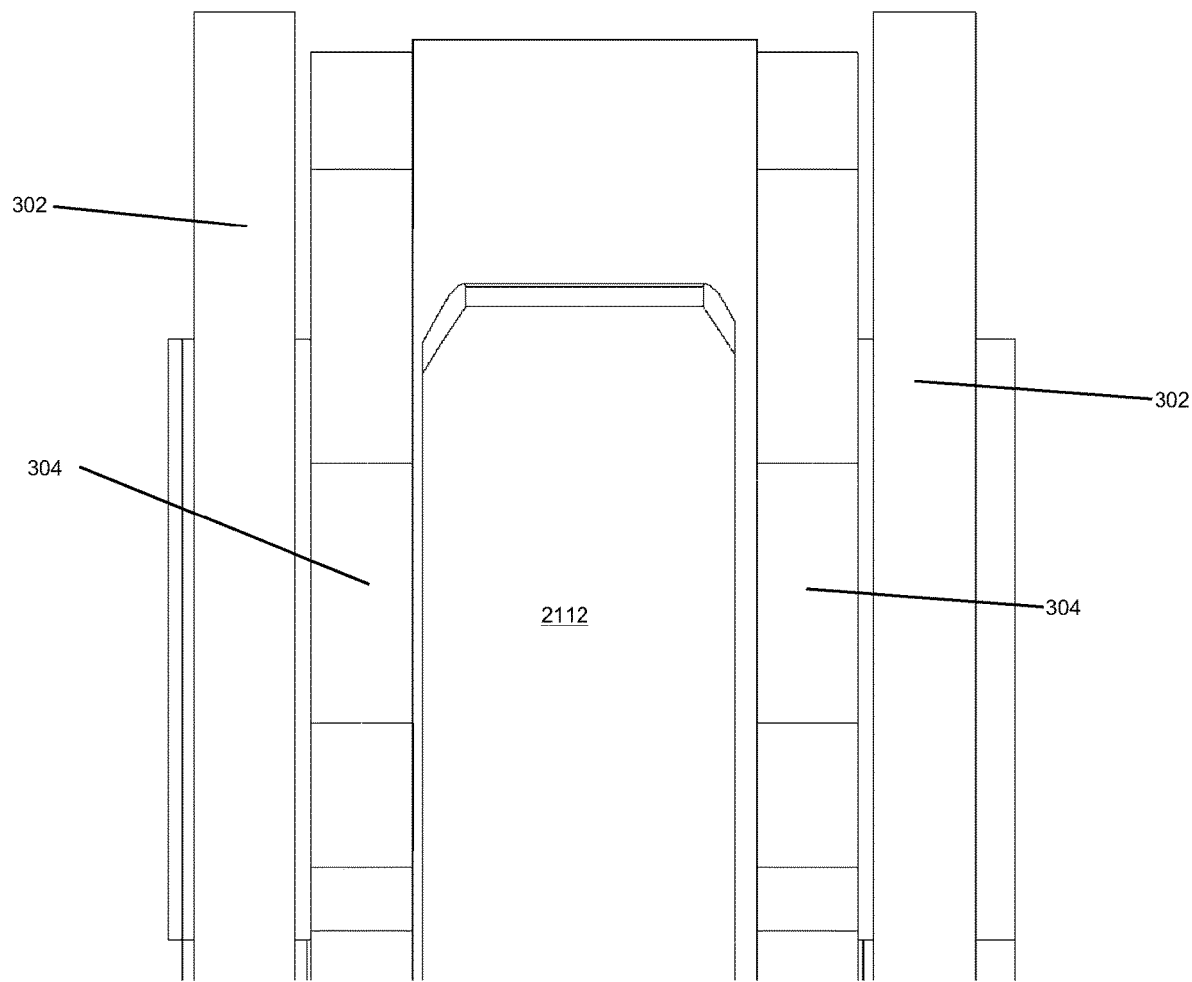
FIG. 40 is a section view through an offset left tooth of a chainring of this disclosure.
Figure 41:
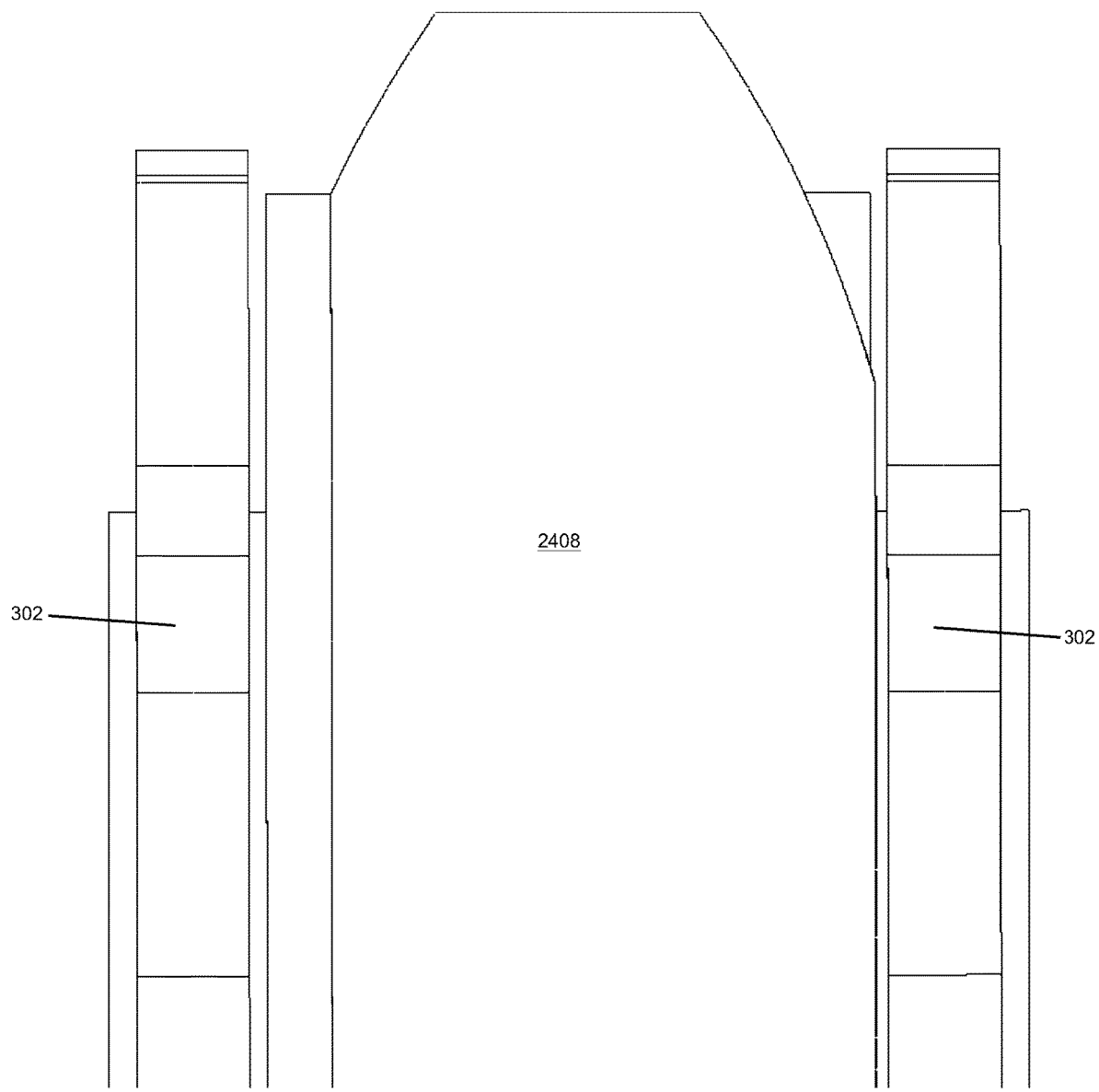
FIG. 41 is a section view through an offset wider right tooth of a chainring of this disclosure.

One embodiment for this disclosure may be substantially similar to that of the chain ring 2600 except for a 30 tooth, 34 tooth, 38 tooth, 42 tooth, 46 tooth, and 50 tooth chain ring will not have the three Full-Wide tooth, Offset-Left tooth, Full-Wide tooth, Offset-Left tooth, Full-Wide tooth grouped together, they'll have the normal pattern repeating around the entire ring of a Full-Wide tooth, Offset-Left tooth, Full-Wide tooth, Offset-Left tooth, Offset-Wider-Right tooth, Offset-Left tooth, Full-Wide tooth. Offset-Left tooth, Full-Wide tooth. In another aspect of this disclosure, the offset teeth may have a curved profile along a leading edge as illustrated in a chainring 2700 in FIGS. 27-32. In this embodiment, not only can any of the teeth have any of the offset or full wide configurations 2108, 2112, 2408, discussed herein, the teeth may also have a curved leading surface 2702. The curved leading surface 2702 may be a surface profile on one side of any given tooth that is not the same as the profile on the other side of the same tooth when viewed from a side view as illustrated in FIGS. 27 and 29. The curved profile 2702 may ensure clean and secure engagement with the pivot pin 306 of the chain 300. This ensures that as a rider applies torque to the crankset, the chainring 2700 adequately contacts the pivot pins 306 of the chain 300 to transfer the torque to the rear sprocket without causing the chain 300 to jump off the chainring 2700. In this embodiment, each tooth may have any of the configurations discussed herein regarding the width of the tooth within the cavity 308, 310 of the chain 300, but additionally have the curved profile 2702 along the leading and/or trailing portion of the tooth.

FIGS. 33-38 illustrate several embodiments of this disclosure having different tooth configurations. A person skilled in the art understands the particular pattern of tooth width configurations 2108, 2112, 2408, on the chainrings depends on the number of teeth on the chainring. As such, FIGS. 33-38 illustrate certain examples of tooth width patterns considered for this disclosure. However, other chainrings have more or less teeth then those specifically illustrated are also considered herein.

Referring now to FIGS. 42-51, another embodiment of the present disclosure is illustrated. In this embodiment, a full wide inner tooth 4202 may be utilized to increase chain retention on the corresponding chain ring. In one aspect of this disclosure, the full wide inner tooth 4202 may be sized to have an inner tooth width 5102 that is slightly less than the width of an inner chain link gap 5002 between inner walls of inner chain links. In one example, the full wide inner tooth 4202 may have an inner tooth width 5102 that is about 91% of the inner chain link gap 5002. Further, the full wide inner tooth 4202 may be slightly offset to one side or the other of the inner chain link gap 5002. In other embodiments, the inner tooth width 5102 may be less than 91% of the inner chain link gap 5002. Further still, in other embodiments contemplated herein the inner tooth width 5102 may be between 91% and about 100% the inner chain link gap 5002.

In one non-exclusive example, the inner chain link gap 5002 may be about 2.270 mm while the full wide inner tooth 4202 width may be about 2.070 mm. In this embodiment, a typical offset of the full wide inner tooth 4202 when a chain 5004 is tracking as expected along the chain ring positions the full wide inner tooth 4202 within the corresponding inner chain link gap 5002 such that one side of the full wide inner tooth 4202 has a slight gap of about 0.080 mm between the full wide inner tooth 4202 and the adjacent inner chain link wall while the opposing side has a gap of about 0.120 mm between the full wide inner tooth 4202 and the adjacent inner chain link wall.

Similarly, an outer chain link gap 5006 may be formed between the inner surfaces of corresponding links of the chain 5004 for the wider chain sections. A full wide outer tooth 5008 may have a full wide tooth width 5010 that is about 96% the outer chain link gap 5006. In other embodiments, the full wide tooth width 5010 may be less than 96% of the outer chain link gap 5006. Further still, in other embodiments contemplated herein the full wide tooth width 5010 may be between 96% and about 100% the outer chain link gap 5006.

In one non-exclusive embodiment, the outer chain link gap 5006 may be about 3.820 mm while the corresponding full wide tooth width 5010 may be about 3.670 mm. This embodiment may have a full wide tooth gap 5012 equally spaced on either side of the full wide outer tooth 5008 within the outer link gap 5006 when the chain 5004 is centrally positioned along the chain ring. In one aspect of this disclosure, the full wide outer tooth 5008 may have a full wide tooth gap 5012 of about 0.075 mm. However, other dimensions and orientations of the full wide tooth 5008 within the full wide tooth width 510 are contemplated herein as well.

While specific example dimensions and offsets are discussed herein, other embodiments contemplated by this disclosure contain different dimensions and offsets of the full wide inner tooth 4202 within the inner chain link gap 5002. For example, the full wide inner tooth 4202 may be substantially centered within the inner chain link gap 5002 in one embodiment. Further still, in one embodiment the full wide inner tooth 4202 may have a width that is about the same as the inner chain link gap 5002. Accordingly, this disclosure contemplates many different dimensions and offset orientations of the full wide inner tooth 4202 within the corresponding inner chain link gap 5002.

Figure 42:
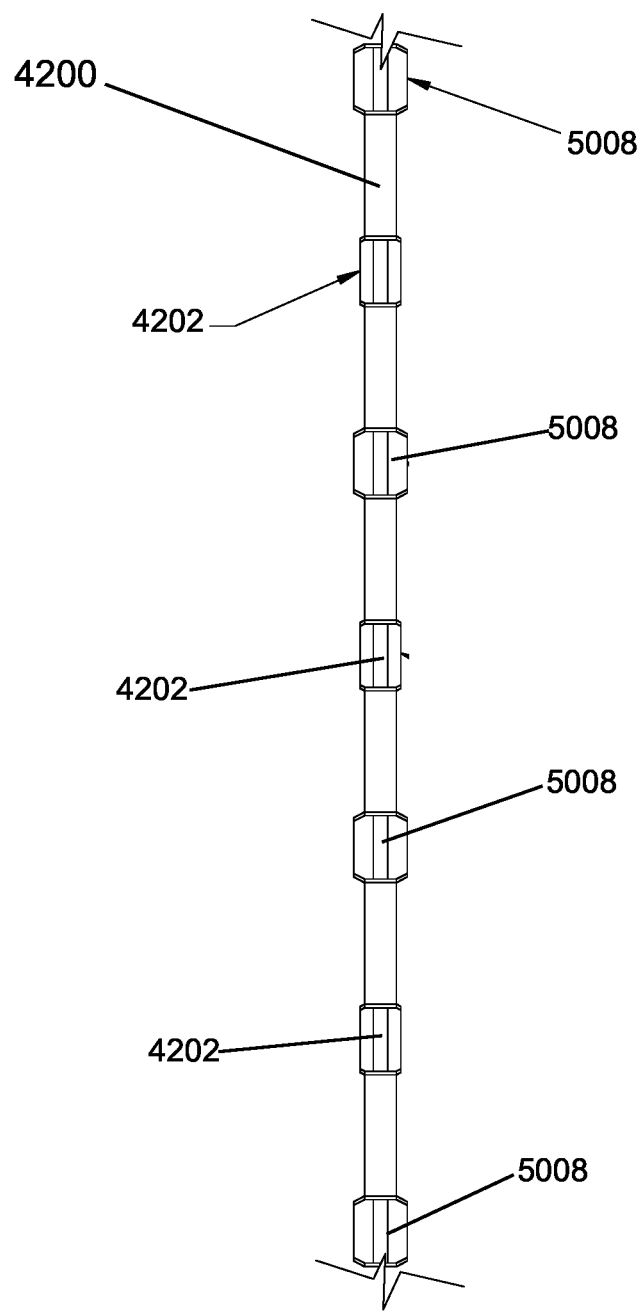
FIG. 42 is a side view of one embodiment of a full wide outer and inner link configuration.
Figure 43:
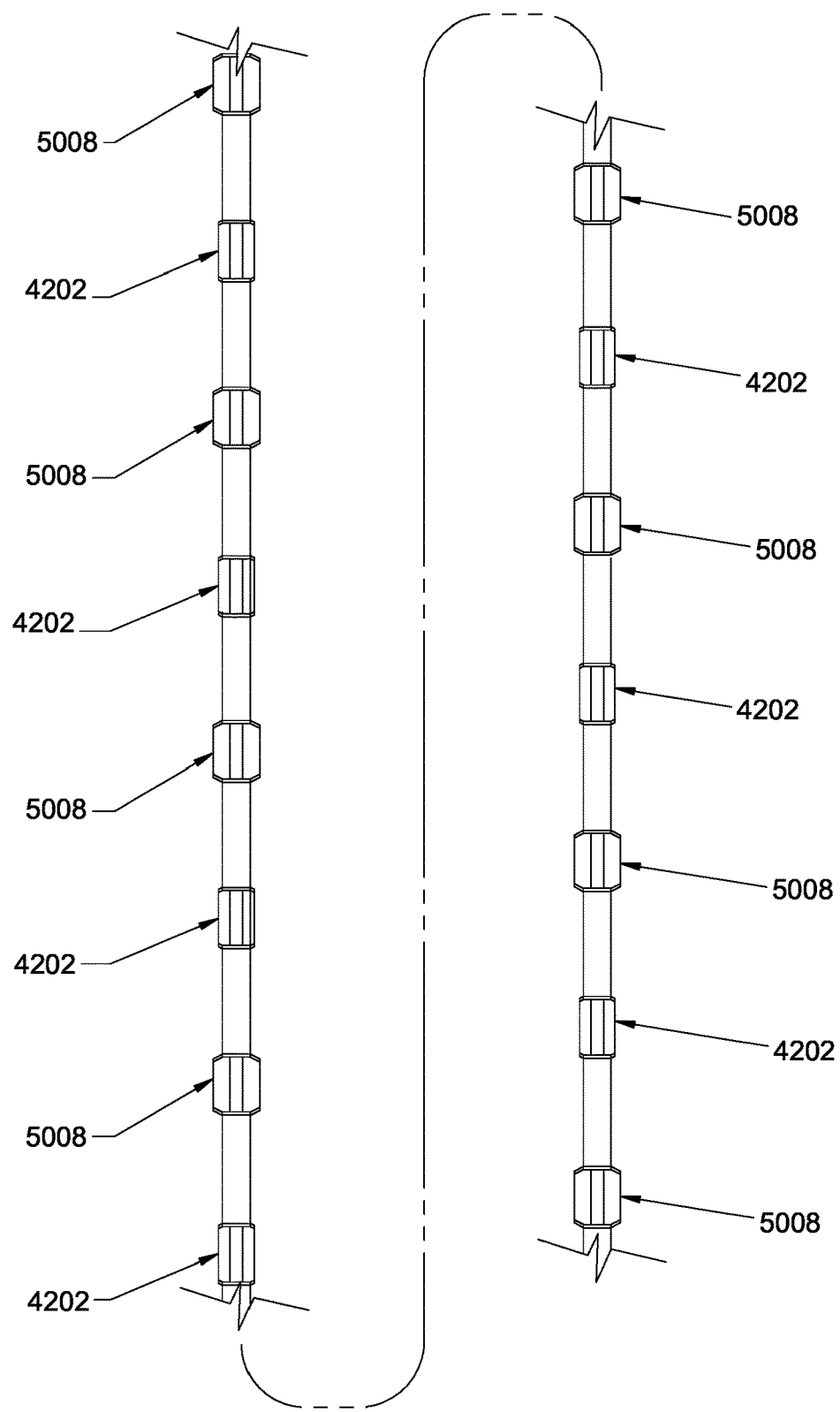
FIG. 43 is an embodiment of the tooth pattern from the embodiment of FIG. 42.

Referring now to FIGS. 42-43, one embodiment of this disclosure may be a chain ring 4200 having alternating full wide outer teeth 5008 and full wide inner teeth 4202. This chain ring 4200 may alter between a full wide outer tooth 5008 and a full wide inner tooth 4202 about the entire chain ring. In one example of this disclosure, the chain ring 4200 may have 32 teeth about the perimeter. However, this disclosure also contemplates chain rings that alternate full wide outer teeth 5008 and full wide inner teeth 4202 with different numbers of total teeth.

Figure 44:
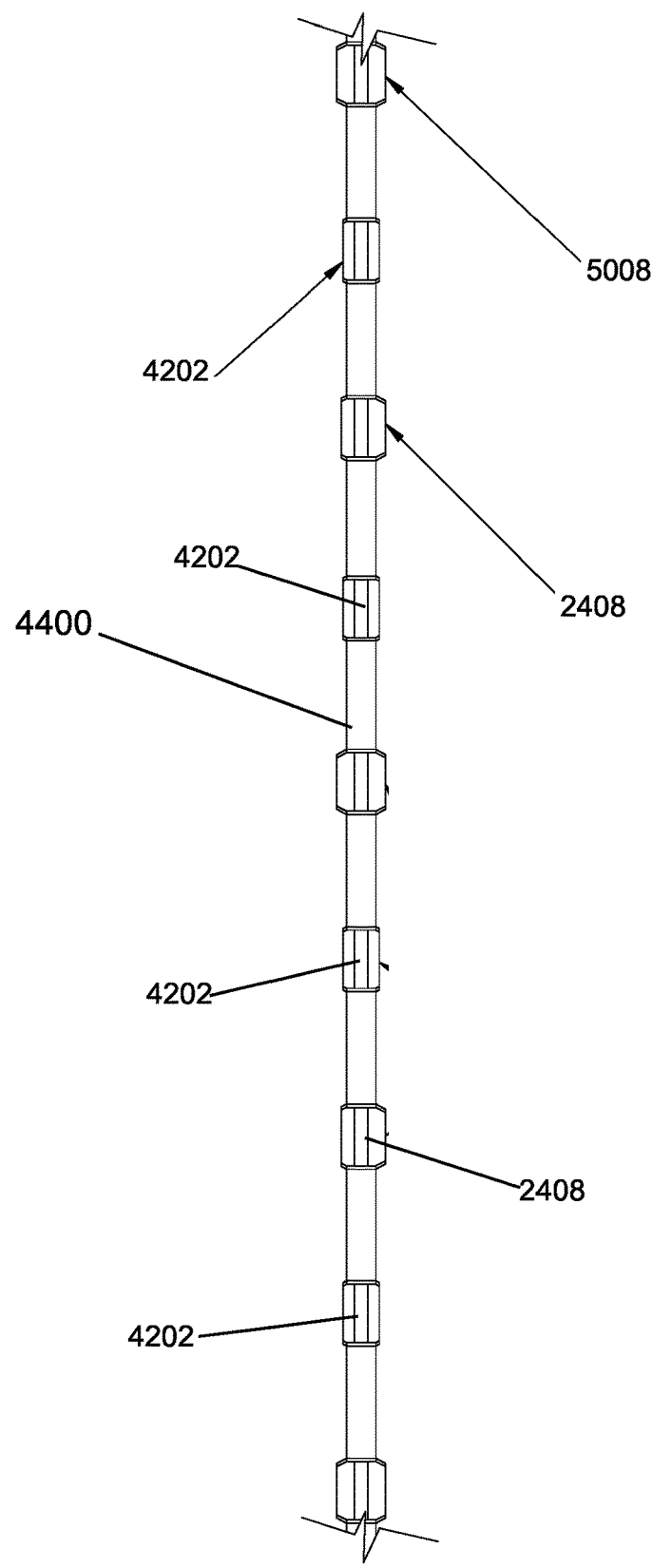
FIG. 44 is a side view of one embodiment of full wide inner links with patterned offset right links.
Figure 45:
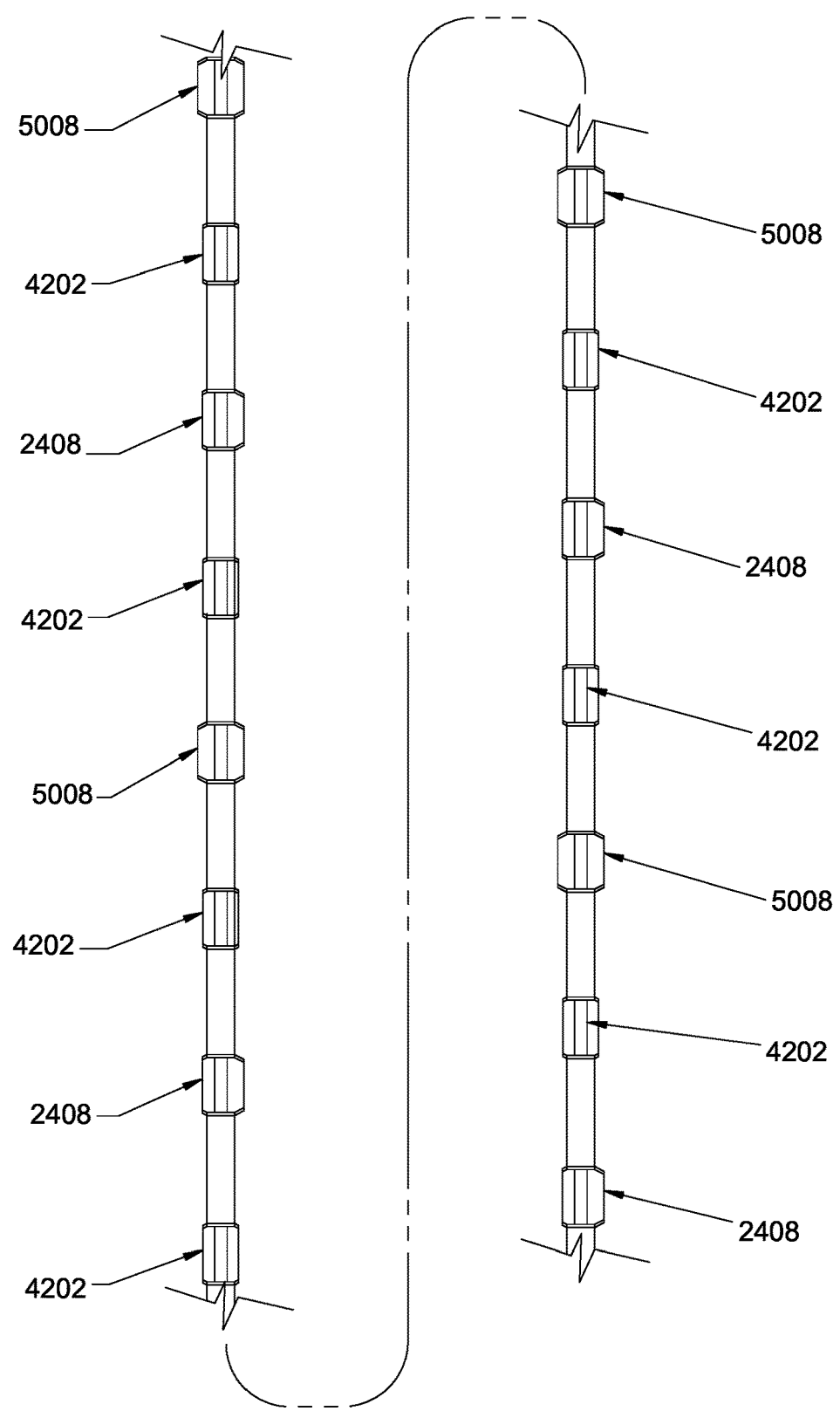
FIG. 45 is an embodiment of the tooth pattern from the embodiment of FIG. 44.

Referring now to FIGS. 44-45, yet another embodiment of this disclosure is illustrated. In this embodiment, a chain ring 4400 may have full wide outer teeth 5008, full wide inner teeth 4202, and offset wider right teeth 2408 about the perimeter. This chain ring 4400 may have any number of teeth able to accommodate the discussed pattern.

Figure 46:
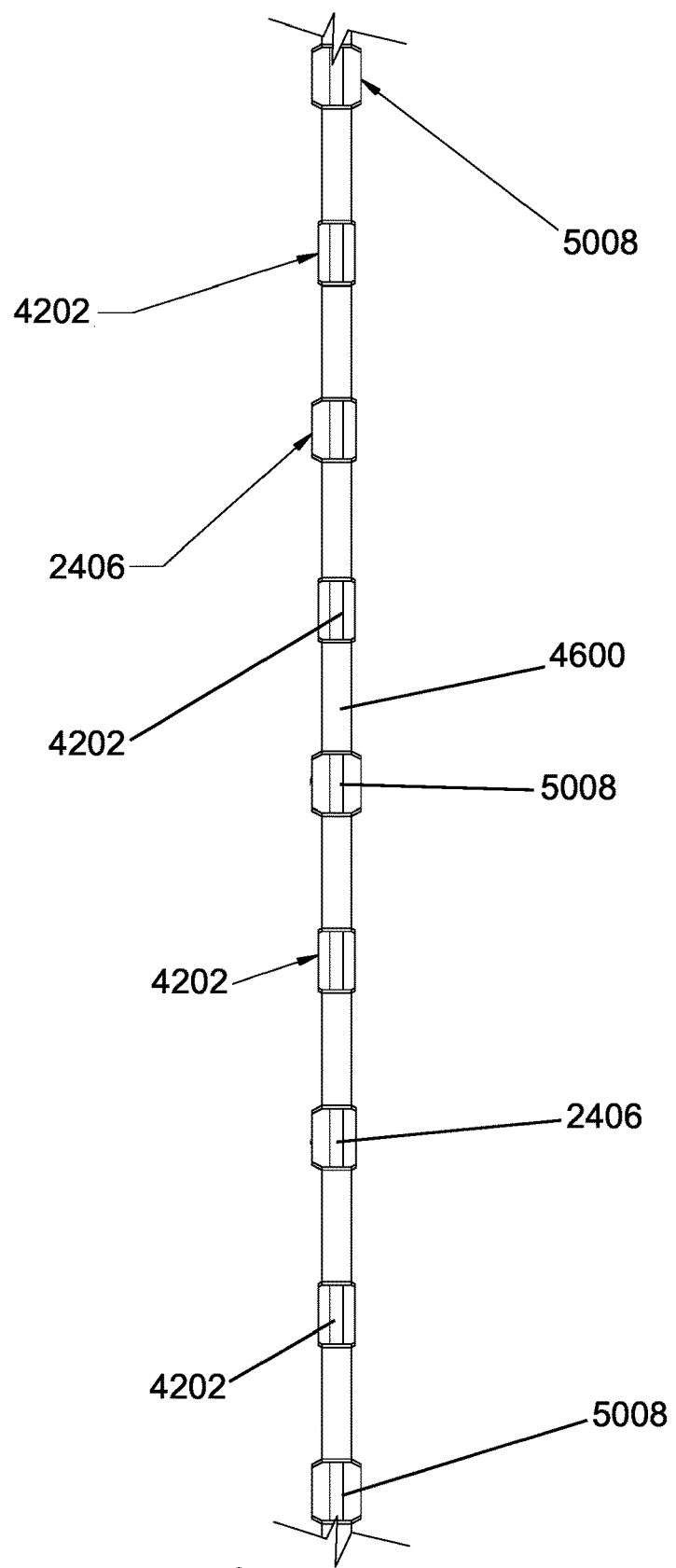
FIG. 46 is a side view of an embodiment having full inner links with offset wider left links.
Figure 47:
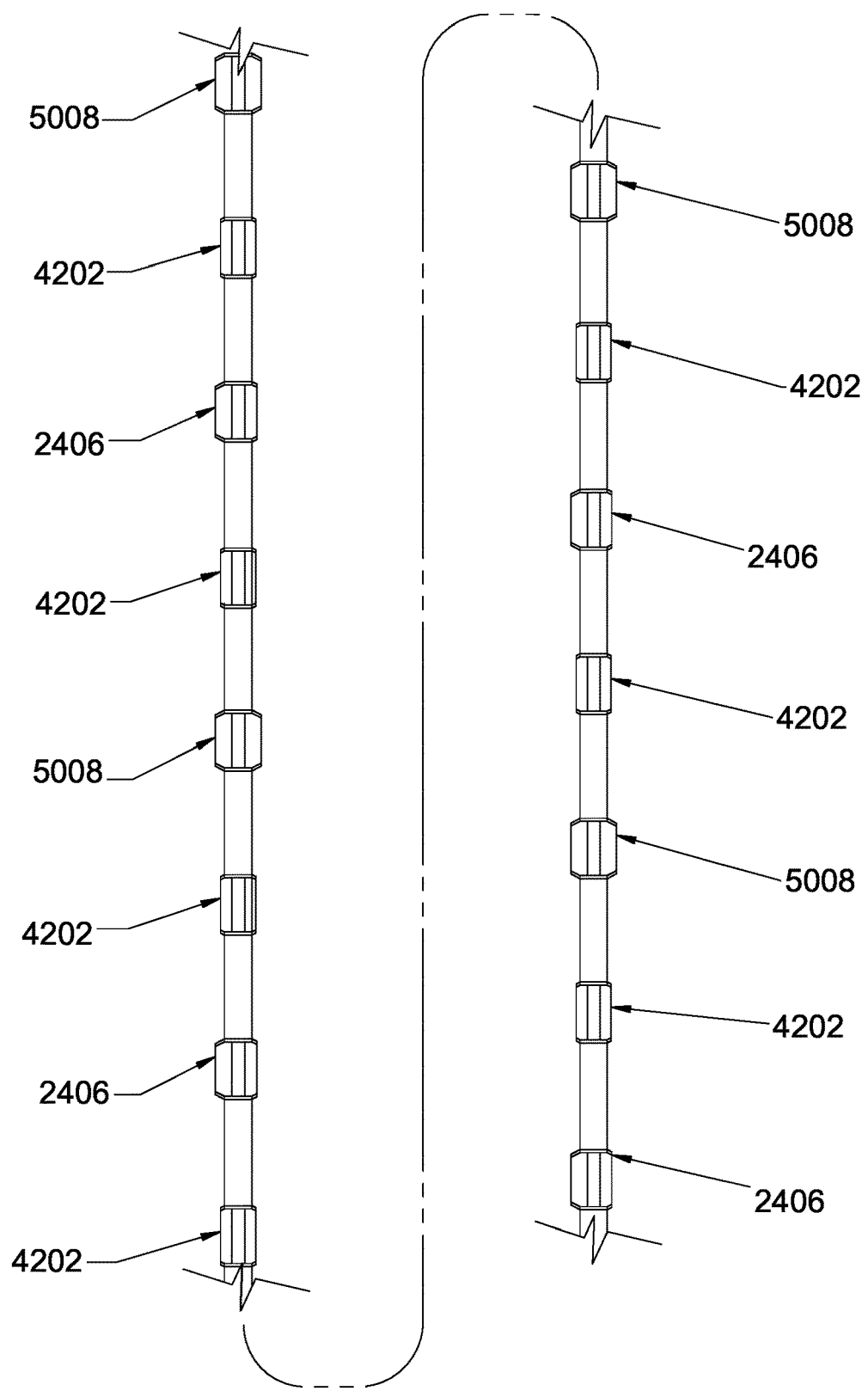
FIG. 47 is an embodiment of the tooth pattern from the embodiment of FIG. 46.

Referring now to FIGS. 46-47, yet another embodiment of this disclosure is illustrated. In this embodiment, a chain ring 4600 may have full wide outer teeth 5008, full wide inner teeth 4202, and offset wider left teeth 2406 about the perimeter. The offset wider left teeth 2406 may be sized to fit within the inside outer link width 5006 but be biased to a left side such that one side of the offset wider left teeth 2406 is positioned closer to the adjacent outer link than the other side of the teeth 2406. This chain ring 4600 may have a pattern of teeth about the perimeter that is a full wide outer tooth 5008 followed by a full wide inner tooth 2406, followed by the offset wider left tooth 2406 and repeating around the chain ring 4600. This chain ring 4600 may have any number of teeth able to accommodate the discussed pattern.

Figure 48:
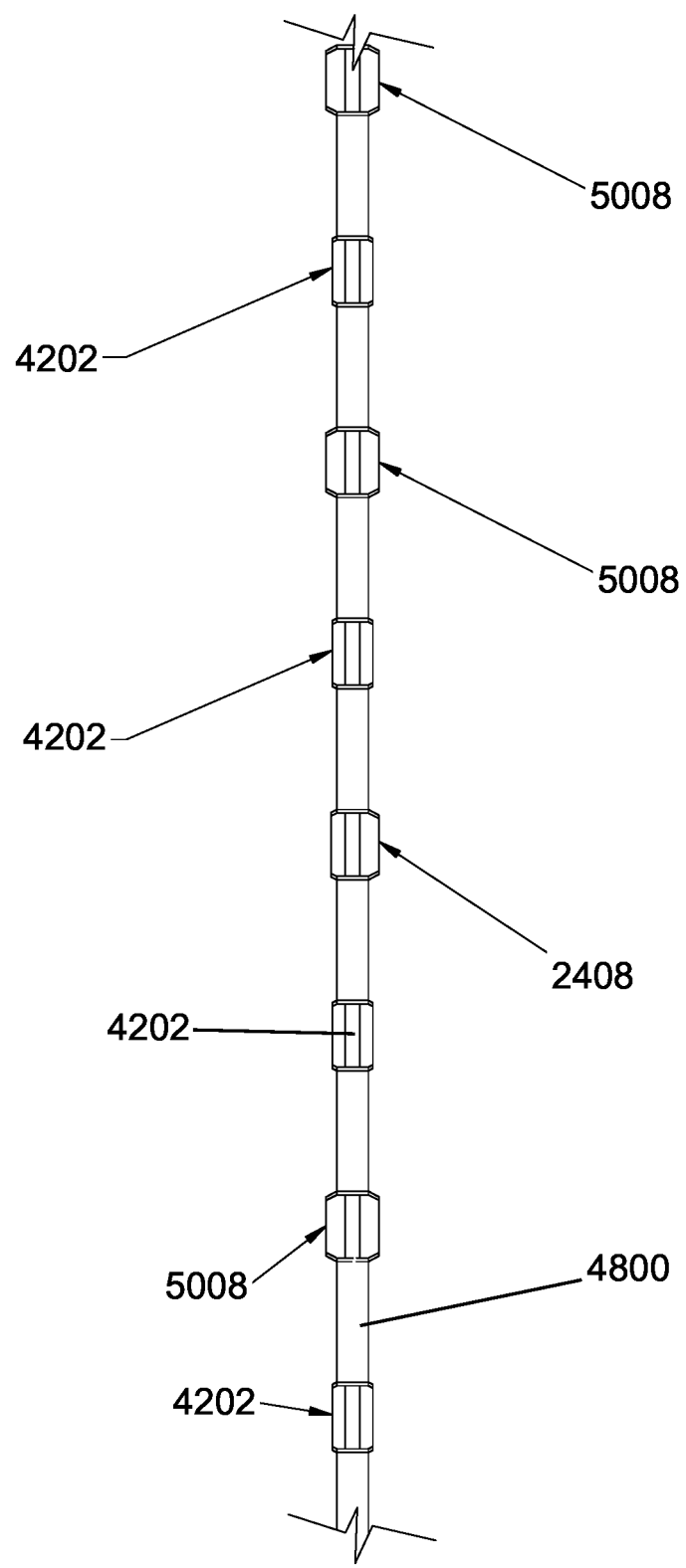
FIG. 48 is a side view of one embodiment of full wide inner links with patterned offset right links.
Figure 49:
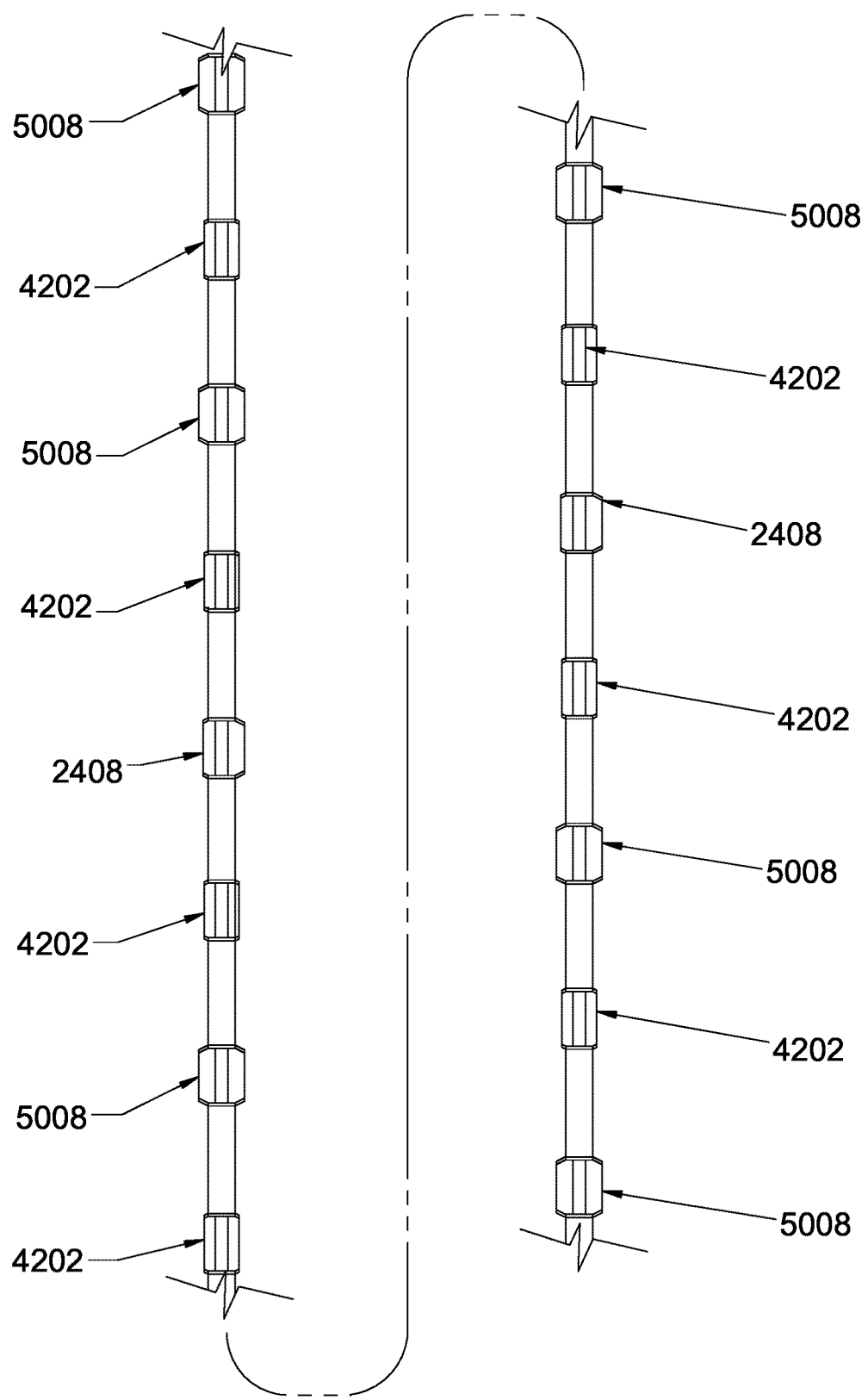
FIG. 49 is an embodiment of the tooth pattern from the embodiment of FIG. 48.
Figure 50:
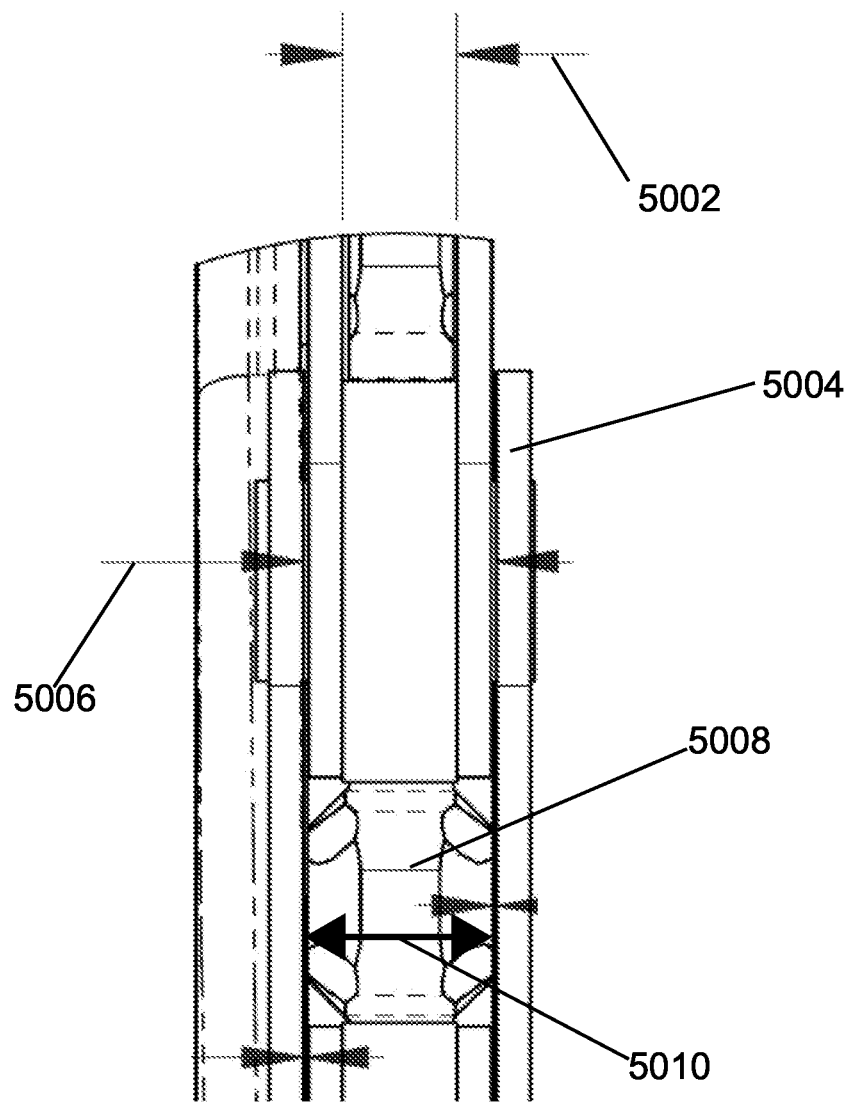
Figure 51:
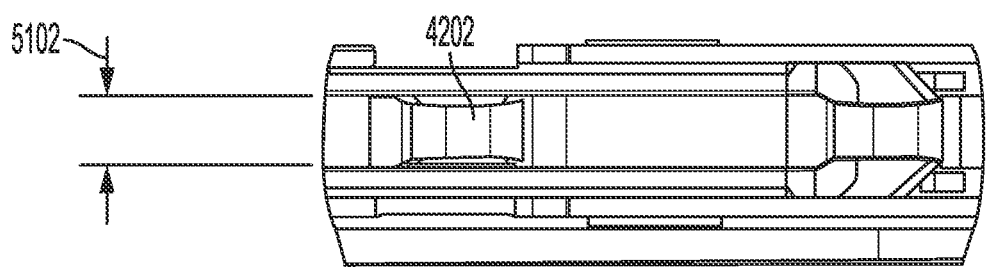

Referring now to FIGS. 48-49, yet another embodiment of this disclosure is illustrated. In this embodiment, a chain ring 4800 may have full wide outer teeth 5008, full wide inner teeth 4202, and offset wider right teeth 2408 about the perimeter. More specifically, the teeth may be in the pattern of full wide outer tooth 5008, full wide inner tooth 4202, full wide outer tooth 5008, full wide inner tooth 4602, offset wider right tooth 2408 repeating. This chain ring 4800 may have any number of teeth able to accommodate the discussed pattern.

Figure 52:
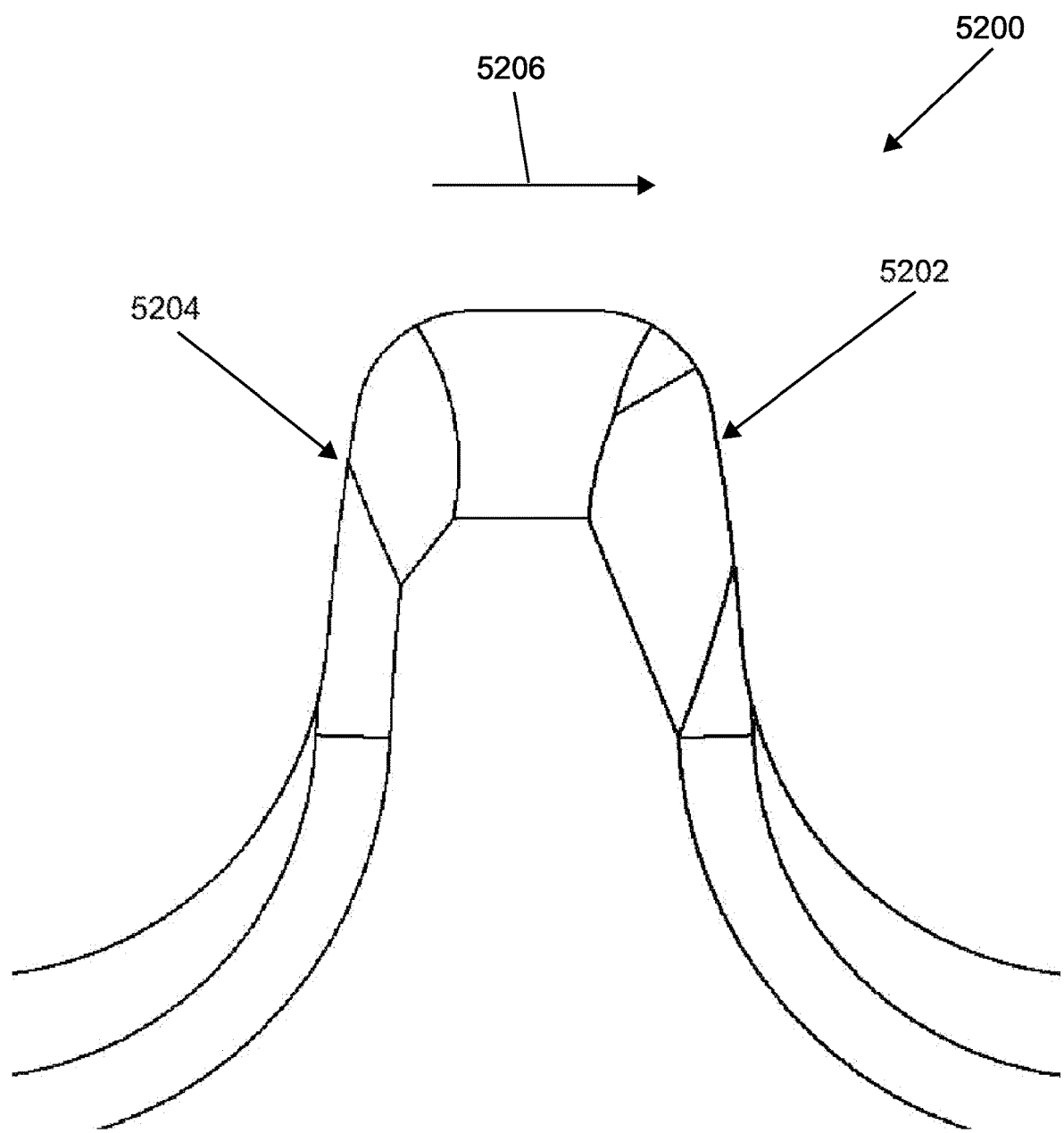
Figure 53:
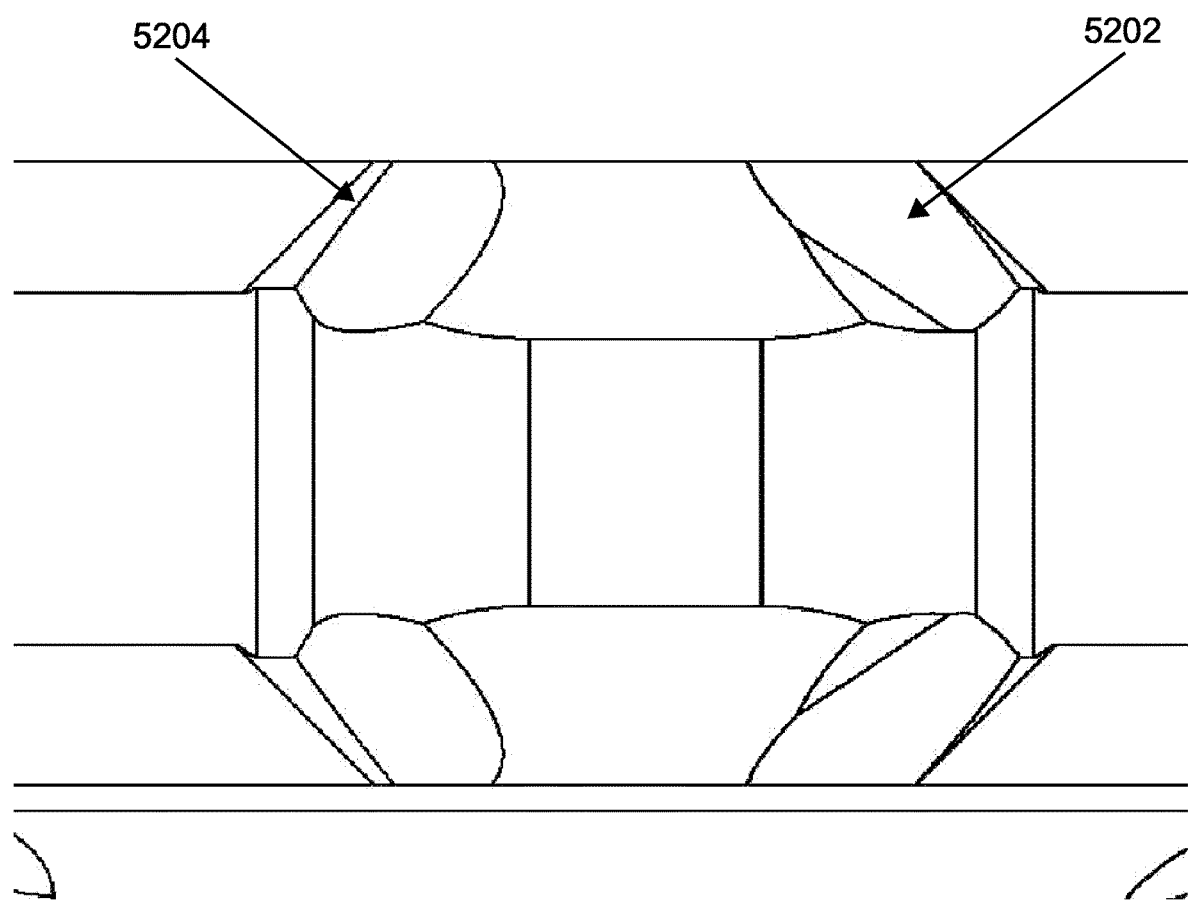

Referring now to FIGS. 52-53, yet another aspect of this disclosure is illustrated. More specifically, any of the teeth discussed herein may be a tooth 5200 that has a modified leading end 5202 compared to a trailing end 5204. The modified leading end 5202 may be then end that typically engages the chain when force is being transferred there through as a corresponding chain ring rotates in the propelling direction 5206. The modified leading end 5202 may have a taper that extends a greater length of the tooth 5200 then the trailing end 5204. The modified leading end 5202 may provide smoother chain engagement that prevents the chain from transitioning off of the corresponding chain ring among other things.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A bicycle chain ring, comprising:
 a plurality of teeth extending radially about an axis of the chain ring, the plurality of teeth comprising:
  a first group of teeth having a first width that is at least 96% the width of an outer link gap of a bicycle chain;
  a second group of teeth that are at least partially offset from a central plane to a first side and have a second width; and
  a third group of teeth that are at least partially offset from a central plane to a second side opposite the first side;
 wherein, the first group of teeth have a base that is sized to be centered on a central plane defined through a center portion of the chainring;
 wherein the chain ring has a repeating series of teeth comprising:
  a first tooth from the first group of teeth;
  a second tooth from the second group of teeth;
  a third tooth from the first group of teeth;
  a fourth tooth from the second group of teeth;
  a fifth tooth from the third group of teeth; and
  a sixth tooth from the second group of teeth;
 wherein the repeating series repeats at least two times consecutively around the chain ring.

2. The bicycle chain ring of claim 1, further wherein the second width is less than the first width.

3. The bicycle chain ring of claim 1, wherein the third group of teeth have a third width that is different from the first width.

4. The bicycle chain ring of claim 3, further wherein the third width is less than the first width.

5. The bicycle chain ring of claim 3, wherein second group of teeth is offset to an inward side of the central plane and the third group of teeth is offset to an outward side of the central plane.

6. The bicycle chain ring of claim 1, further wherein the second width is less than the width of the space between two inner chain links of a bicycle chain.

7. A bicycle chain ring, comprising:
- a plurality of teeth extending radially about an axis of the chain ring, the plurality of teeth including a first group of teeth and a second group of teeth and a third group of teeth;
- wherein the first group of teeth has a first width at a tooth base that is sized to be received within a chain cavity defined between parallel outer links of a bicycle chain, the first width being at least 96% a chain cavity width defined between the parallel outer links;
- wherein the second group of teeth are at least partially offset from a central plane to a first side and have a second width at the tooth base, the second width being different from the first width;
- wherein the third group of teeth that are at least partially offset from the central plane to a second side opposite the first side;
- wherein the chain ring has a repeating series of teeth comprising:
  - a first tooth from the first group of teeth;
  - a second tooth from the second group of teeth;
  - a third tooth from the first group of teeth;
  - a fourth tooth from the second group of teeth;
  - a fifth tooth from the third group of teeth; and
  - a sixth tooth from the second group of teeth;
- wherein the repeating series repeats at least two times consecutively around the chain ring.

8. The bicycle chain ring of claim 7, further wherein at least one tooth of the chain ring has a modified leading end compared to a trailing end.

9. The bicycle chain ring of claim 7, wherein the second width is at least 91% of the size of an inner chain link gap defined by the chain cavity.

10. A bicycle chain ring, consisting of:
- a first group of teeth having a first width that is at least 96% the width of an outer link gap of a bicycle chain;
- a second group of teeth that are at least partially offset from a central plane to a first side and have a second width; and
- a third group of teeth that are at least partially offset from a central plane to a second side opposite the first side;
- wherein the chain ring has a repeating series of teeth comprising the following consecutive order of teeth:
  - a first tooth from the first group of teeth;
  - a second tooth from the second group of teeth;
  - a third tooth from the first group of teeth;
  - a fourth tooth from the second group of teeth;
  - a fifth tooth from the third group of teeth; and
  - a sixth tooth from the second group of teeth.

* * * * *